United States Patent
Williams et al.

(10) Patent No.: US 11,907,733 B1
(45) Date of Patent: Feb. 20, 2024

(54) APPLICATION DOCKING

(71) Applicant: Hewlett-Packard Development Company, L.P., Spring, TX (US)

(72) Inventors: Alexander Morgan Williams, Spring, TX (US); Syed Azam, Tomball, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 63 days.

(21) Appl. No.: 17/894,633

(22) Filed: Aug. 24, 2022

(51) Int. Cl.
*G06F 9/00* (2006.01)
*G06F 9/445* (2018.01)
*G06K 19/06* (2006.01)
*H04M 1/72403* (2021.01)

(52) U.S. Cl.
CPC ... *G06F 9/44505* (2013.01); *G06K 19/06037* (2013.01); *H04M 1/72403* (2021.01)

(58) Field of Classification Search
CPC ......... G06F 9/44505; G06K 19/06037; H04M 1/72403
See application file for complete search history.

(56) References Cited

U.S. PATENT DOCUMENTS

| | | | |
|---|---|---|---|
| 10,911,992 B2 | 2/2021 | Abuan et al. | |
| 10,999,767 B2 | 5/2021 | Abuan et al. | |
| 11,128,610 B2 | 9/2021 | Yang et al. | |
| 2018/0082050 A1* | 3/2018 | Flink | H04L 9/3228 |
| 2019/0066089 A1* | 2/2019 | Miryala | G06Q 20/367 |
| 2022/0150237 A1* | 5/2022 | Canfield | H04L 63/104 |

\* cited by examiner

*Primary Examiner* — Nitin C Patel
(74) *Attorney, Agent, or Firm* — Quarles & Brady LLP

(57) ABSTRACT

An example target device is described for facilitating application docking. In various aspects, the target device can comprise a processor. In various instances, the target device can comprise a non-transitory machine-readable memory that can store machine-readable instructions. In various cases, the processor can execute the machine-readable instructions, which can cause the processor to launch, based on a dock request that is to indicate a session of a first instance of an application of an initiator device, a second instance of the application on the target device. In various aspects, the second instance can resume the session. In various instances, the launch can be based on a determination that a dock credential of a Quick Response (QR) code generated by the target device is in the dock request.

15 Claims, 20 Drawing Sheets

1500

1502 — TRANSMITTING, BY AN INITIATOR DEVICE COMPRISING A PROCESSOR AND TO A TARGET DEVICE, A DOCK REQUEST, WHEREIN THE DOCK REQUEST IS TO INDICATE A SESSION OF A FIRST INSTANCE OF AN APPLICATION OF THE INITIATOR DEVICE, WHEREIN THE DOCK REQUEST IS TO INSTRUCT THE TARGET DEVICE TO LAUNCH A SECOND INSTANCE OF THE APPLICATION TO CONTINUE THE SESSION, AND WHEREIN THE TRANSMITTING IS IN RESPONSE TO A DETECTION OF A QUICK RESPONSE (QR) CODE GENERATED BY THE TARGET DEVICE

- 1502: TRANSMITTING, BY AN INITIATOR DEVICE COMPRISING A PROCESSOR AND TO A TARGET DEVICE, A DOCK REQUEST, WHEREIN THE DOCK REQUEST IS TO INDICATE A SESSION OF A FIRST INSTANCE OF AN APPLICATION OF THE INITIATOR DEVICE, WHEREIN THE DOCK REQUEST IS TO INSTRUCT THE TARGET DEVICE TO LAUNCH A SECOND INSTANCE OF THE APPLICATION TO CONTINUE THE SESSION, AND WHEREIN THE TRANSMITTING IS IN RESPONSE TO A DETECTION OF A QUICK RESPONSE (QR) CODE GENERATED BY THE TARGET DEVICE

- 1602:
  PROMPTING, BY THE INITIATOR DEVICE AND BASED ON A DETERMINATION THAT THE INITIATOR DEVICE IS WITHIN A THRESHOLD DISTANCE OF THE TARGET DEVICE, THE TARGET DEVICE TO RENDER THE QR CODE;

SCANNING, BY THE INITIATOR DEVICE, THE QR CODE, WHEREIN THE QR CODE IS TO INDICATE A DOCK CREDENTIAL; AND

INSERTING, BY THE INITIATOR DEVICE, THE DOCK CREDENTIAL IN THE DOCK REQUEST

- 1604: CANCELLING, BY THE INITIATOR DEVICE, THE FIRST INSTANCE, BASED ON THE LAUNCH OF THE SECOND INSTANCE

FIG. 16

APPLICATION DOCKING

BACKGROUND

A computing device can participate in a session of an application. During the session, a user of the computing device may want to continue the session on a different computing device.

BRIEF DESCRIPTION OF THE DRAWINGS

FIGS. 15-16 illustrate flow diagrams of example, non-limiting computer-implemented methods that can facilitate application docking in accordance with various examples described herein.

DETAILED DESCRIPTION

Figure 1:
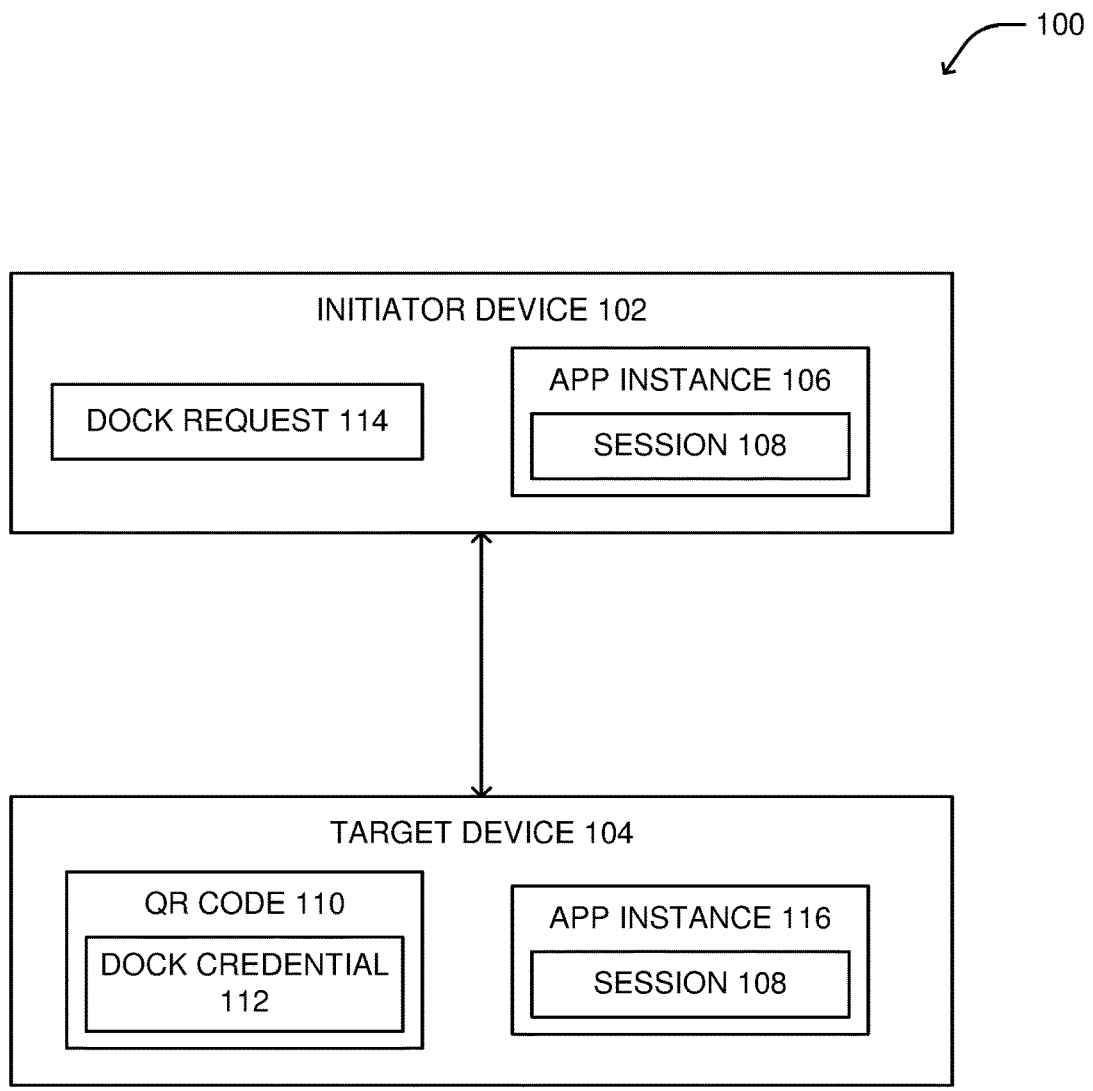
FIG. 1 illustrates a block diagram of an example, non-limiting apparatus that can facilitate application docking in accordance with various examples described herein.

The following detailed description is merely illustrative and is not intended to limit examples or applications/uses of examples. Furthermore, there is no intention to be bound by any expressed or implied information presented in the preceding Background section or in the Detailed Description section.

A computing device (e.g., a smartphone, a desktop computer, a laptop computer, a tablet device) can participate in a session of an application (e.g., a computer program). For example, a smartphone can participate in a videoconferencing call by launching an instance of a videoconferencing application that is installed on or otherwise accessible to the smartphone (e.g., accessible through a browser of the smartphone). As another example, a smartphone can participate in a videogame session by launching an instance of a videogame application that is installed on or otherwise accessible to the smartphone. As still another example, a smartphone can participate in a document editing session by launching an instance of a word processing application that is installed on or otherwise accessible to the smartphone. As yet another example, a smartphone can participate in a media playing session (e.g., can play a movie, can play a musical piece) by launching a media player application that is installed on or otherwise accessible to the smartphone.

In various aspects, a user of the computing device may, at some point during the session, want to continue the session on a different computing device. To accomplish this, the user can manually re-login to the session on the different computing device. However, such manual re-login can be considered as time-consuming, cumbersome, or distracting to the user.

For example, suppose that a user's smartphone is participating in a videoconferencing call via an instance of a videoconferencing application, and suppose that the user wants to continue the videoconferencing call using their desktop computer instead of their smartphone. In such case, while the smartphone is participating in the videoconferencing call, the user can: manually boot-up their desktop computer; manually launch a second instance of the videoconferencing application that is installed on the desktop computer; and manually sign-in to the videoconferencing call through the second instance of the videoconferencing application (e.g., by inputting call credentials such as meeting number, participant number, or password). Such manual re-login procedure can consume excessive amounts of the user's time. Moreover, such manual re-login procedure can distract the user from substantive content of the videoconferencing call (e.g., the user can be unable or less able to intelligently participate in or otherwise contribute to the videoconferencing call while preoccupied with the manual re-login procedure).

As another example, suppose that a user's smartphone is participating in a videogame session via an instance of a videogame application, and suppose that the user wants to continue the videogame session using their tablet device instead of their smartphone. In such case, while the smartphone is participating in the videogame session, the user can: manually boot-up their tablet device; manually launch a second instance of the videogame application that is installed on the tablet device; and manually sign-in to the videogame session through the second instance of the videogame application (e.g., by inputting videogame credentials such as username, password, or in-game progress identifier). Again, such manual re-login procedure can consume excessive amounts of the user's time. Furthermore, such manual re-login procedure can distract the user from substantive content of the videogame session (e.g., the user can be unable or less able to intelligently play in the videogame session while preoccupied with the manual re-login procedure).

As yet another example, suppose that a user's smartphone is participating in a document editing session via an instance of a word processing application, and suppose that the user wants to continue the document editing session using their laptop computer instead of their smartphone. In such case, while the smartphone is participating in the document editing session, the user can: manually boot-up their laptop computer; manually launch a second instance of the word processing application that is installed on the laptop computer; and manually select the document editing session through the second instance of the word processing application (e.g., by inputting session credentials such as username, password, or document identifier; or by selecting a saved file corresponding to the document editing session). Once more, such manual re-login procedure can consume excessive amounts of the user's time. Moreover, such manual re-login procedure can distract the user from substantive content of the document editing session (e.g., the user can be unable or less able to intelligently edit a document while preoccupied with the manual re-login procedure).

As still another example, suppose that a user's smartphone is playing a movie via an instance of a media player application, and suppose that the user wants to continue the movie using their desktop computer instead of their smartphone. In such case, the user can: manually pause the movie on their smartphone at a particular scene; manually boot-up their desktop computer; manually launch a second instance of the media player application that is installed on the desktop computer; manually select the movie to be played by the second instance; and manually scrub through the movie until the particular scene is found. Once more, such manual re-login procedure can consume excessive amounts of the user's time. Moreover, such manual re-login procedure can distract the user from substantive content of the movie (e.g., the user can be unable or less able to focus on the movie while preoccupied with the manual re-login procedure).

Accordingly, manual re-login procedures can consume excessive amounts of time and can be considered as distracting to users.

Various examples described herein can be directed to computer processing devices, computer-implemented methods, apparatuses, or computer program products that can facilitate application docking. In other words, various examples described herein can be considered as techniques for automatically migrating an application session from one computing device to another computing device in a less cumbersome, less time-consuming, less distracting, or more seamless fashion, as compared to manual re-login procedures.

In particular, there can be an initiator device and a target device. In various aspects, the initiator device can be any suitable computing device comprising a processor and a non-transitory machine-readable memory. As a non-limiting example, the initiator device can be a mobile computing device, such as a smartphone. In various cases, the target device can likewise be any suitable computing device comprising a processor and a non-transitory machine-readable memory. As a non-limiting example, the target device can be a stationary computing device, such as a desktop computer.

In various examples, a first instance of an application can be installed on or otherwise accessible to the initiator device. In various aspects, the application can be any suitable computer program that can be designed to carry out any suitable computing task for an end-user. As some non-limiting examples, the application can be: a videoconferencing application that can facilitate videoconferencing calls; a videogame application that can facilitate a videogame; a word processing application that can create, delete, or otherwise edit an electronic document; or a media player application that can play electronic media, such as movies or music. In various aspects, a second instance of the application can be installed on or otherwise accessible to the target device.

In various cases, the initiator device can launch the first instance of the application, so as to participate in a session hosted, performed, or otherwise facilitated by the application. As a non-limiting example, if the application is a videoconferencing application, then the session can be a particular videoconferencing call (e.g., having a particular call identifier, having a particular agenda, involving a particular group of callers/participants). As another non-limiting example, if the application is a videogame application, then the session can be a particular videogame level or mission (e.g., having a particular level/mission identifier, having a particular amount of in-game progress). As still another non-limiting example, if the application is a word processing application, then the session can be a particular document (e.g., having a particular document identifier, having a particular number of words/pages). As yet another non-limiting example, if the application is a media player application, then the session can be a particular media record (e.g., having a particular record identifier, having a particular runtime, having a particular amount of playback completion).

In various aspects, the target device can detect whether or not the initiator device is within any suitable threshold proximity (e.g., any suitable threshold distance) of the target device. In various cases, the target device can perform such proximity detection via any suitable wireless network monitoring technique. For example, the target device can be coupled to a given wireless network (e.g., near-field communication (NFC) network, a personal area network (PAN), a local area network (LAN), a home area network (HAN), a building area network (BAN)). In various aspects, the target device can continuously, continually, or periodically monitor the given wireless network, so as to detect when another computing device (e.g., having a unique device identifier) connects to or disconnects from the given wireless network. Thus, if the initiator device connects to the given wireless network, the target device can detect such connection and can conclude that the initiator device is within the threshold proximity of the target device.

In various aspects, if the target device concludes that the initiator device is within the threshold proximity of the target device, the target device can render, on any suitable electronic display (e.g., computer screen, computer monitor) of the target device, a quick response (QR) code. In various cases, the QR code can be an optical barcode or matrix code (e.g., a machine-readable optical label or machine-readable optical image) that contains, represents, or otherwise indicates encoded information, or that is otherwise correlated/mapped to such encoded information. In various cases, any suitable cryptographic technique or any suitable encoding mode can be used to generate the QR code or to otherwise store, encrypt, encode, or embed information into the QR code, such as numeric, alphanumeric, byte/binary, or kanji techniques. In various aspects, the QR code, once rendered, can visually appear to be a two-dimensional matrix or rectilinear grid of black and white squares, where the particular arrangement/pattern of the black and white squares in the matrix/grid can represent, indicate, or correspond to stored, encrypted, encoded, or embedded information. Although the QR code can be a two-dimensional matrix or rectilinear grid of black and white squares, this is a mere non-limiting example. In some cases, the QR code can exhibit any suitable dimensionality (e.g., can be a one-dimensional barcode), can exhibit any suitable shape (e.g., can be circular, polygonal, slanted, irregular, or otherwise not necessarily rectilinear), and can exhibit any suitable colors or combinations of colors.

In any case, the QR code can contain, include, encode, or otherwise convey a dock credential. That is, the dock credential can represented by, correlated to, or otherwise cryptographically hidden within the QR code. In various aspects, the dock credential can be any suitable numeric or alphanumeric piece of electronic data exhibiting any suitable format, size, or dimensionality (e.g., the dock credential can be any suitable number of scalars, any suitable number of vectors, any suitable number of matrices, any suitable number of tensors, any suitable number of character strings, or any suitable combination thereof). In various examples, the dock credential can be considered as a password or passcode that grants permission or authorization to perform application docking with the target device.

Although the target device can render the QR code in response to the target device detecting that the initiator device is within the threshold proximity of the target device, this is a mere non-limiting example. In various aspects, the initiator device can detect (e.g., via any suitable wireless network monitoring technique) whether or not the initiator device is within the threshold proximity of the target device. In such case, if the initiator device determines that it is within the threshold proximity of the target device, then the initiator device can transmit an electronic message to the target device, where such electronic message can prompt or otherwise instruct the target device to prepare for application docking. In various aspects, the target device can render the QR code, in response to such electronic message.

In any case, the target device can electronically render the QR code on an electronic display, in response to a determination (e.g., determined by the target device or by the initiator device) that the initiator device is within the threshold proximity of the target device.

In various aspects, the initiator device can scan, capture, or otherwise read the QR code as rendered on the electronic display of the target device. For example, the initiator device can have a camera (e.g., a smartphone camera, a web camera, a universal serial bus (USB) camera), and the initiator device can optically scan the electronic display of the target device, and thus the QR code, via the camera. In particular, the initiator device can capture an image of the QR code (or can capture any other suitable optical characteristics of the QR code) as rendered on the electronic display of the target device, and the initiator device can apply any suitable cryptographic techniques to the captured image (to the optical characteristics) so as to decrypt information that is stored in, encrypted in, encoded in, embedded in, correlated to, or otherwise represented by the QR code. Accordingly, because the QR code can include, represent, or convey the dock credential, the initiator device can identify the dock credential by scanning, capturing, or otherwise reading the QR code as rendered on the electronic display of the target device.

In various aspects, the initiator device can generate a dock request based on the dock credential. In various cases, the dock request can be any suitable electronic message that indicates any suitable metadata pertaining to the session of the first instance of the application that is running on the initiator device. In various aspects, such metadata can include: any suitable numeric or alphanumeric identifier corresponding to the application or to the first instance of the application; any suitable numeric or alphanumeric credentials corresponding to the session; any suitable electronic content of the session; or any suitable user-preferences pertaining to the session.

As a non-limiting example, suppose that the session is a videoconferencing call of a videoconferencing application installed on the initiator device. In such case, the metadata can include an identifier of the videoconferencing application, a meeting number of the videoconferencing call, sign-in credentials associated with the videoconferencing call (e.g., a caller username, a caller password), or user-preferences associated with the videoconferencing call (e.g., sound/volume preferences, screen brightness/magnification preferences, backdrop filter preferences).

As another non-limiting example, suppose that the session is a videogame mission of a videogame application installed on the initiator device. In such case, the metadata can include an identifier of the videogame application, an identifier of the videogame mission, sign-in credentials associated with the videogame mission (e.g., a player username, a player password), a level of in-game completion/progress associated with the videogame mission, or user-preferences associated with the videogame mission (e.g., sound/volume preferences, screen brightness/magnification preferences, control configuration preferences).

As still another non-limiting example, suppose that the session is a document being edited by a word processing application installed on the initiator device. In such case, the metadata can include an identifier of the word processing application, an identifier of the document, sign-in credentials associated with the document (e.g., an editor username, an editor password), textual content of the document, or user-preferences associated with the document (e.g., sound/volume preferences, screen brightness/magnification preferences, font/type-face preferences).

As yet another non-limiting example, suppose that the session is a movie being played by a media player application installed on the initiator device. In such case, the metadata can include an identifier of the media player application, an identifier of the movie, sign-in credentials associated with the movie (e.g., a viewer username, a viewer password), a level of playback completion of the movie, or user-preferences associated with the movie (e.g., sound/volume preferences, screen brightness/magnification preferences, subtitle/language preferences).

In addition to the session metadata, the dock request can, in various aspects, include the dock credential. In other words, the initiator device can insert the dock credential into the dock request (e.g., the dock credential can accompany the session metadata). In various cases, the initiator device can then electronically transmit the dock request to the target device. In various examples, the dock request can be considered or otherwise interpreted as an instruction, from the initiator device and for the target device, to perform application docking using the session metadata.

In various aspects, the target device can receive the dock request. In various cases, the target device can parse through the dock request in search of the dock credential. If the target device fails to locate the dock credential within the dock request (e.g., if the dock request were generated by an initiator device that did not scan the QR code), then the target device can infer/conclude that application docking with respect to the session is prohibited due to lack of authorization/permission. In contrast, if the target device locates the dock credential within the dock request, then the target device can infer/conclude that application docking with respect to the session is permitted/authorized. In such case, because a second instance of the application can be installed on the target device, the target device can automatically launch such second instance of the application using the session metadata provided in the dock request. This can cause the second instance of the application to continue, carry-on, or otherwise resume the session. In various aspects, the initiator device can cancel or otherwise close the first instance of the application, in response to the launching of the second instance of the application on the target device.

As a non-limiting example, suppose that the session is a videoconferencing call of a videoconferencing application, and suppose that the metadata in the dock request includes a meeting number of the videoconferencing call and sign-in credentials associated with the videoconferencing call (e.g., a caller username, a caller password). In such case, the target device can launch, activate, or otherwise invoke its instance (e.g., the second instance) of the videoconferencing application, and the target device can automatically join or otherwise login to the videoconferencing call using the meeting number and sign-in credentials provided in the dock request. In some cases, if the metadata further includes user-preferences (e.g., volume preferences, screen brightness/magnification preferences, backdrop filter preferences), then the target device can configure its instance of the videoconferencing application in accordance with such user-preferences. In various aspects, in response to the target device joining/logging-in to the videoconferencing call using the meeting number and sign-in credentials, the initiator device can close or otherwise deactivate its instance (e.g., the first instance) of the videoconferencing application. In this way, the videoconferencing call can be considered as automatically migrating (e.g., as being automatically docked) from the initiator device to the target device, in response to the initiator device scanning/capturing the QR code rendered by the target device. From the perspective of a user of the initiator device and of the target device, this can be considered as less time-consuming or more seamless than manually re-logging-in to the videoconferencing call.

As another non-limiting example, suppose that the session is a videogame mission of a videogame application, and suppose that the metadata includes an identifier of the videogame mission, sign-in credentials associated with the videogame mission (e.g., a player username, a player password), and a level of in-game completion/progress associated with the videogame mission. In such case, the target device can launch, activate, or otherwise invoke its instance (e.g., the second instance) of the videogame application, and the target device can automatically join or otherwise login to the videogame mission using the identifier, the sign-in credentials, and the level of in-game completion/progress provided in the dock request. In some cases, if the metadata further includes user-preferences (e.g., volume preferences, screen brightness/magnification preferences, control configuration preferences), then the target device can configure its instance of the videogame application in accordance with such user-preferences. In various aspects, in response to the target device joining/logging-in to the videogame mission using the identifier, the sign-in credentials, and the level of in-game completion/progress, the initiator device can close or otherwise deactivate its instance (e.g., the first instance) of the videogame application. In this way, the videogame mission can be considered as automatically migrating (e.g., as being automatically docked) from the initiator device to the target device, in response to the initiator device scanning/capturing the QR code rendered by the target device. From the perspective of a user of the initiator device and of the target device, this can be considered as less time-consuming or more seamless than manually re-logging-in to the videogame mission.

As still another non-limiting example, suppose that the session is a document being edited by a word processing application, and suppose that the metadata includes an identifier of the document, sign-in credentials associated with the document (e.g., an editor username, an editor password), and textual content of the document. In such case, the target device can launch, activate, or otherwise invoke its instance (e.g., the second instance) of the word processing application, and the target device can automatically open the document using the identifier, the sign-in credentials, and the textual content provided in the dock request. In some cases, if the metadata further includes user-preferences (e.g., volume preferences, screen brightness/magnification preferences, font/type-face preferences), then the target device can configure its instance of the word processing application in accordance with such user-preferences. In various aspects, in response to the target device opening the document using the identifier, the sign-in credentials, and the textual content, the initiator device can close or otherwise deactivate its instance (e.g., the first instance) of the word processing application. In this way, the document can be considered as automatically migrating (e.g., as being automatically docked) from the initiator device to the target device, in response to the initiator device scanning/capturing the QR code rendered by the target device. From the perspective of a user of the initiator device and of the target device, this can be considered as less time-consuming or more seamless than manually re-opening the document.

As yet another non-limiting example, suppose that the session is a movie being played by a media player application, and suppose that the metadata can include an identifier of the movie, sign-in credentials associated with the movie (e.g., a viewer username, a viewer password), and a level of playback completion of the movie. In such case, the target device can launch, activate, or otherwise invoke its instance (e.g., the second instead) of the media player application, and the target device can automatically open the movie using the identifier, the sign-in credentials, and the level of playback completion provided in the dock request. In some cases, if the metadata further includes user-preferences (e.g., volume preferences, screen brightness/magnification preferences, subtitle/language preferences), then the target device can configure its instance of the media player application in accordance with such user-preferences. In various aspects, in response to the target device opening the movie using the identifier, the sign-in credentials, and the level of playback completion, the initiator device can close or otherwise deactivate its instance (e.g., the first instance) of the media player application. In this way, the movie can be considered as automatically migrating (e.g., as being automatically docked) from the initiator device to the target device, in response to the initiator device scanning/capturing the QR code rendered by the target device. From the perspective of a user of the initiator device and of the target device, this can be considered as less time-consuming or more seamless than manually re-opening the movie.

In any case, the target device can resume or continue the session, by launching the second instance of the application based on the session metadata provided in the dock request. In various aspects, the target device can transmit an electronic message to the initiator device, where the electronic message can indicate that the session has been resumed/continued by the second instance of the application. In various cases, the initiator device can close the first instance of the application in response to such electronic message (e.g., in response to the launch of the second instance of the application).

In various aspects, the target device can render, on its electronic display, any suitable graphical user-interface pertaining to the session.

As a non-limiting example, after receiving/parsing the dock request but before launching the second instance of the application, the target device can, in various cases, render a graphical user-interface on its electronic display. In various aspects, such graphical user-interface can indicate that the session is dockable on the target device or can otherwise request user-provided confirmation to proceed with docking the session. In such case, the target device can launch the second instance of the application based on the session metadata in the dock request, in response to receiving such user-provided confirmation.

As another non-limiting example, the target device can, in various cases, have or otherwise control a set of hardware accessories. In various aspects, a hardware accessory can be any suitable integral accessory or USB-connected accessory that can be controlled by the target device, such as a pair of headphones, a web camera, a joystick, or a light array. In such case, the target device can render a graphical user-interface on its electronic display, where such graphical user-interface can indicate the set of hardware accessories or can otherwise request user-provided input selecting which of such set of hardware accessories should be allocated to the session. In response to receiving such user-provided input, the target device can allocate the selected hardware accessories to the second instance of the application accordingly.

Thus far, various examples have been described in which application docking can be facilitated directly between the initiator device and the target device. However, these are mere non-limiting examples. In various other aspects, there can be an intermediary device that can control or otherwise govern a set of target devices (e.g., any suitable number of target devices), and the initiator device can facilitate application docking by interacting with the intermediary device, as opposed to directly interacting with the set of target devices. In various cases, the intermediary device can be any suitable computing device comprising a processor and a non-transitory machine-readable memory that can be considered as controlling or governing (e.g., as being the master of) the set of target devices. As a non-limiting example, the intermediary device can be HP Device Bridge.

In various aspects, it can be determined (e.g., by the initiator device or by the intermediary device, via wireless network monitoring techniques) that the initiator device is within a threshold proximity of the intermediary device. In response to such determination, the intermediary device can render the QR code on any suitable electronic display. In various cases, just as described above, the initiator device can scan/capture the QR code, can generate the dock request based on the scanned/captured QR code, where the dock request can specify the session metadata, and can transmit the dock request to the intermediary device. In various aspects, the intermediary device can check whether the dock request includes the dock credential. If the intermediary device determines that the dock request does not include the dock credential, then the intermediary device can render a graphical user-interface on its electronic display, where such graphical user-interface can indicate that application docking is prohibited due to lack of permission/authorization. On the other hand, if the intermediary device determines that the dock request includes the dock credential, then the intermediary device can render a graphical user-interface on its electronic display, where such graphical user-interface can indicate the set of target devices or can otherwise request user-provided input selecting which of the set of target devices should continue/resume the session. In response to receiving such user-provided input, the intermediary device can instruct the selected target device to launch a second instance of the application using the session metadata provided in the dock request, thereby continuing/resuming the session.

Accordingly, various examples described herein can facilitate automatic application docking based on QR code scanning, which can be considered as less time-consuming, less distracting, less cumbersome, or more seamless than manual re-login techniques.

Various examples described herein can be employed to use computerized hardware or machine-readable instructions to perform functionalities that are highly technical in nature (e.g., to facilitate application docking), that are not abstract and that cannot be performed as a set of mental acts by a human. Further, some of the processes performed can be performed by a specialized computer (e.g., a QR code display, a QR code scanner) for carrying out defined tasks related to application docking. For example, such defined tasks can include: transmitting, by an initiator device comprising a processor and to a target device, a dock request, wherein the dock request can indicate a session of a first instance of an application of the initiator device, wherein the dock request can instruct the target device to launch a second instance of the application to continue the session, and wherein the transmitting can be in response to a detection of a QR code generated by the target device. In various cases, such defined tasks can further include: launching, based on a dock request that is to indicate a session of a first instance of an application of an initiator device, a second instance of the application on a target device, wherein the second instance can resume the session, and wherein the launch can be based on a determination that a dock credential of a QR code generated by the target device is in the dock request.

Such defined tasks are not performed manually by humans. Indeed, neither the human mind nor a human with pen and paper can: electronically render a QR code on a computer screen of a target device; electronically scan the QR code by an initiator device; electronically generate, by the initiator device, a dock request that includes session data of an application session running on the initiator device and that includes a dock credential encoded in the QR code; electronically transmit, by the initiator device, the dock request to the target device; and electronically resume, by the target device, the application session based on the session metadata and the dock credential. Indeed, only computerized devices can generate, render, or scan QR codes. Moreover, only computerized devices can host application sessions by launching instances of computerized applications. None of such aspects can reasonably, sensibly, or practicably be performed by humans without computers.

Furthermore, various examples described herein can integrate into a practical application various teachings relating to application docking. As explained above, a user can begin an application session on one computing device and can want to resume the application session on a different computing device. To accomplish this, the user can manually re-login to the application session via the different computing device. However, such manual re-login can be time-consuming, cumbersome, and distracting to the user. In stark contrast, various examples described herein can automatically migrate an application session from one computing device to another computing device, based on a dock request specified in a scanned/captured QR code. Specifically, an initiator device can run a session of a first instance of a computing application. In various aspects, a target device can render a QR code that contains a dock credential. In various cases, the initiator device can scan the QR code, thereby identifying the dock credential. In response to scanning the QR code, the initiator device can transmit a dock request to the target device, where the target request can indicate session metadata (e.g., login-credentials associated with the session) as well as the dock request. In various aspects, based on verifying that the dock request includes the dock credential, the target device can launch a second instance of the computing application using the session metadata. Accordingly, the second instance of the computing application can be considered as resuming/continuing the session. In response to such launch of the second instance of the computing application, the initiator device can close/cancel the first instance of the computing application. Accordingly, from the perspective of a user, the application session can be considered as automatically migrating from the initiator device to the target device in response to scanning/capturing of the QR code. Note that such a technique can be considered as less cumbersome, less time-consuming, or more seamless for the user, as compared to a manual re-login technique. Accordingly, various examples described herein constitute useful and practical applications of computers.

Furthermore, various examples described herein can control real-world tangible devices based on the disclosed teachings. For example, various examples described herein can electronically involve rendering a real-world QR code on a computer screen of a real-world target device, electronically scanning the real-world QR code by a camera of a real-world initiator device, and electronically migrating or docking an application session from the real-world initiator device to the real-world target device based on the real-world QR code.

It should be appreciated that the herein figures and description provide non-limiting examples and are not necessarily drawn to scale.

FIG. 1 illustrates a block diagram of an example, non-limiting apparatus 100 that can facilitate application docking in accordance with various examples described herein. As shown, an initiator device 102 can be in electronic communication, via any suitable wired or wireless electronic connection, with a target device 104.

In various aspects, the initiator device 102 can be any suitable computing device comprising a processor and a non-transitory computer-readable memory. As some non-limiting examples, the initiator device 102 can be a smartphone, a tablet, a smartwatch, a desktop computer, a laptop computer, or a vehicle-integrated computer. Likewise, the target device 104 can be any suitable computing device comprising a processor and a non-transitory computer-readable memory. As some non-limiting examples, the target device 104 can be a smartphone, a tablet, a smartwatch, a desktop computer, a laptop computer, or a vehicle-integrated computer. In various cases, the initiator device 102 can be a mobile computing device (e.g., a smartphone), and the target device 104 can be a stationary computing device (e.g., a desktop computer).

In various aspects, the initiator device 102 can electronically host an app instance 106. In various cases, the app instance 106 can be any suitable instance (e.g., any suitable copy) of any suitable computing application that can be installed on the initiator device 102. As some non-limiting examples, the app instance 106 can be an instance (e.g., a copy) of a videoconferencing application that is installed on the initiator device 102, an instance (e.g., a copy) of a videogaming application that is installed on the initiator device 102, an instance (e.g., a copy) of a word processing application that is installed on the initiator device 102, or an instance (e.g., a copy) of a media player application that is installed on the initiator device 102.

In any case, the app instance 106 can electronically perform, facilitate, or otherwise conduct a session 108. In various aspects, characteristics (e.g., type, format, content) of the session 108 can depend upon the app instance 106. For example, if the app instance 106 is an instance of a videoconferencing application, then the session 108 can be a videoconferencing call that is conducted by the app instance 106. As another example, if the app instance 106 is an instance of a videogaming application, then the session 108 can be a videogame mission that is conducted by the app instance 106. As still another example, if the app instance 106 is an instance of a word processing application, then the session 108 can be an electronic document that is edited by the app instance 106. As yet another example, if the app instance 106 is an instance of a media player application, then the session 108 can be a media record (e.g., a movie, a song) that is played by the app instance 106.

In various aspects, a user associated with the initiator device 102 and with the target device 104 may want to migrate or dock the session 108 from the initiator device 102 to the target device 104. In other words, because the session 108 can be conducted by the app instance 106 which can be installed on the initiator device 102, the user can participate in the session 108 by interacting with the initiator device 102 (e.g., by pressing buttons of the initiator device 102, by using a touchscreen of the initiator device 102). However, the user may want to participate in the session 108 by instead interacting with the target device 104. Various examples described herein can facilitate such migration or docking of the session 108.

In various aspects, the target device 104 can electronically render, on any suitable electronic display associated with the target device 104, a QR code 110. In various cases, the QR code 110 can be any suitable optical bar code or optical matrix code that can contain, indicate, represent, or otherwise convey a dock credential 112. In various examples, the dock credential 112 can be any suitable piece of electronic data that can be considered as a password or passcode for permitting application docking/migration to occur between the initiator device 102 and the target device 104. In various cases, the dock credential 112 can be a numeric or alphanumeric code of any suitable size, format, or dimensionality.

In various aspects, the initiator device 102 can electronically scan the electronic display of the target device 104, thereby capturing or reading the QR code 110 and thus the dock credential 112.

In various cases, the initiator device 102 can electronically generate a dock request 114 based on the dock credential 112 and based on the session 108. In particular, the dock request 114 can be any suitable electronic message that can contain the dock credential 112 and that can contain data pertaining to the session 108. In various examples, the data pertaining to the session 108 can include identifiers associated with the session 108, login credentials associated with the session 108, session content associated with the session 108, or user-preferences associated with the session 108. In various aspects, the initiator device 102 can electronically transmit the dock request 114 to the target device 104.

In various aspects, the target device 104 can electronically launch an app instance 116 based on the dock request 114.

More specifically, in various cases, the target device 104 can parse the dock request 114 in search for the dock credential 112. If the target device 104 determines that the dock credential 112 is not in the dock request 114 (e.g., if the dock request 114 were generated by an initiator device that did not scan the QR code 110), then the target device 104 can conclude that application docking/migration is not permitted between the initiator device 102 and the target device 104. However, if the target device 104 instead determines that the dock credential 112 is in the dock request 114, then the target device 104 can launch the app instance 116 based on the data pertaining to the session 108.

In various cases, the app instance 116 can be installed on the target device 104 and can match or otherwise correspond to the app instance 106. In other words, the app instance 116 and the app instance 106 can be considered as different instances (e.g., different copies) of the same computing application. As a non-limiting example, if the app instance 106 is an instance (e.g., a copy) of a particular videoconferencing application that is installed on the initiator device 102, then the app instance 116 can be another instance (e.g., another copy) of that same, particular videoconferencing application, where such another instance can be installed on the target device 104. As another non-limiting example, if the app instance 106 is an instance (e.g., a copy) of a particular videogaming application that is installed on the initiator device 102, then the app instance 116 can be another instance (e.g., another copy) of that same, particular videogaming application, where such another instance can be installed on the target device 104. As yet another non-limiting example, if the app instance 106 is an instance (e.g., a copy) of a particular word processing application that is installed on the initiator device 102, then the app instance 116 can be another instance (e.g., another copy) of that same, particular word processing application, where such another instance can be installed on the target device 104. As even another non-limiting example, if the app instance 106 is an instance (e.g., a copy) of a particular media player application that is installed on the initiator device 102, then the app instance 116 can be another instance (e.g., another copy) of that same, particular media player application, where such another instance can be installed on the target device 104.

Accordingly, in various aspects, the target device 104 can launch the app instance 116 using the data pertaining to the session 108, so as to continue or resume the session 108. More specifically, the data pertaining to the session 108 can, as mentioned above, include identifiers associated with the session 108, login credentials associated with the session 108, session content associated with the session 108, or user-preferences associated with the session 108. So, in various cases, the app instance 116 can join, login to, or otherwise recreate the session 108 by leveraging such identifiers, login credentials, session content, or user-preferences.

In some aspects, in response to launching the app instance 116, the target device 104 can electronically transmit to the initiator device 102 an instruction to close the app instance 106. In response to receiving such instruction, the initiator device 102 can close the app instance 106.

Accordingly, the result can be that the session 108 can now be conducted, performed, or otherwise facilitated on the target device 104 (e.g., via the app instance 116) rather than on the initiator device 102 (e.g., via the app instance 106). In other words, the session 108 can be considered as having been migrated or docked from the initiator device 102 to the target device 104.

Figure 2:
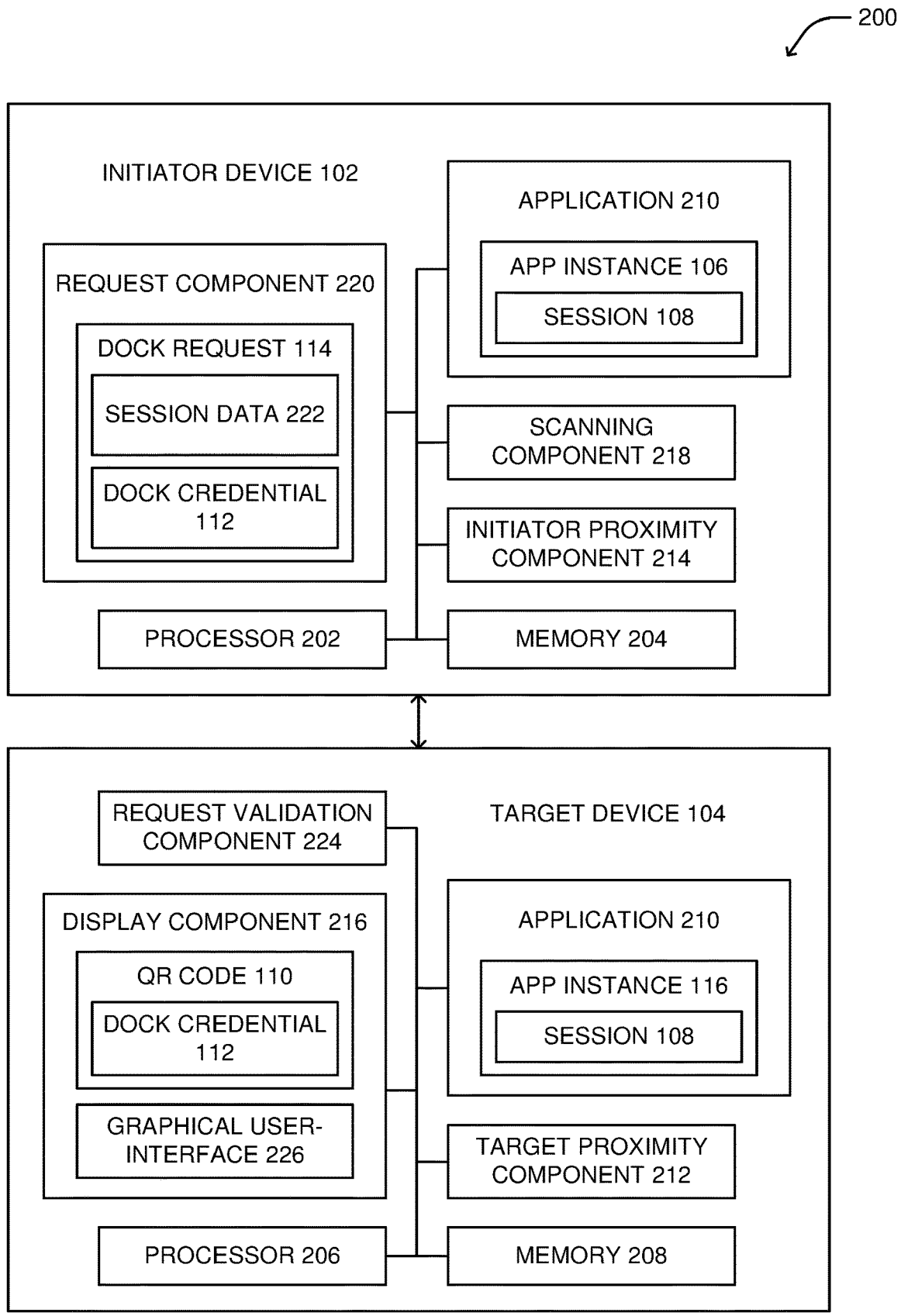
FIG. 2 illustrates a block diagram of an example, non-limiting apparatus including various additional components that can facilitate application docking in accordance with various examples described herein.

FIG. 2 illustrates a block diagram of an example, non-limiting apparatus 200 including various additional components that can facilitate application docking in accordance with various examples described herein.

In various aspects, as shown, the initiator device 102 can comprise a processor 202 (e.g., computer processing unit, microprocessor) and a non-transitory computer-readable memory 204 that can be operably or operatively or communicatively connected or coupled to the processor 202. Non-limiting examples of the non-transitory computer-readable memory 204 can include a scratchpad memory, a random access memory ("RAM"), a cache memory, a non-volatile random-access memory ("NVRAM"), or any suitable combination thereof. The non-transitory computer-readable memory 204 can store machine-readable instructions which, upon execution by the processor 202, can cause the processor 202 or other components of the initiator device 102 (e.g., application 210, initiator proximity component 214, scanning component 218, request component 220) to perform any suitable number of acts. In various examples, the non-transitory computer-readable memory 204 can store computer-executable components (e.g., application 210, initiator proximity component 214, scanning component 218, request component 220), and the processor 202 can execute the computer-executable components.

In various cases, as also shown, the target device 104 can comprise a processor 206 (e.g., computer processing unit, microprocessor) and a non-transitory computer-readable memory 208 that can be operably or operatively or communicatively connected or coupled to the processor 206. Non-limiting examples of the non-transitory computer-readable memory 208 can include a scratchpad memory, a RAM, a cache memory, an NVRAM, or any suitable combination thereof. The non-transitory computer-readable memory 208 can store machine-readable instructions which, upon execution by the processor 206, can cause the processor 206 or other components of the target device 104 (e.g., application 210, target proximity component 212, display component 216, request validation component 224) to perform any suitable number of acts. In various examples, the non-transitory computer-readable memory 208 can store computer-executable components (e.g., application 210, target proximity component 212, display component 216, request validation component 224), and the processor 206 can execute the computer-executable components.

In various aspects, as shown, the app instance 106 can be considered as an instance (e.g., a copy) of an application 210 that is installed on the initiator device 102. Also as shown, the app instance 116 can be considered as another instance (e.g., another copy) of the application 210 that is installed on the target device 104. In other words, the app instance 106 and the app instance 116 can be considered as different instances (e.g., different copies) of the application 210.

As a non-limiting example, the application 210 can be a videoconferencing application. In such case, the app instance 106 can be considered as a copy (e.g., an instance) of that videoconferencing application that is installed on the initiator device 102, whereas the app instance 116 can be considered as a copy (e.g., an instance) of that videoconferencing application that is installed on the target device 104.

As another non-limiting example, the application 210 can be a videogaming application. In such case, the app instance 106 can be considered as a copy (e.g., an instance) of that videogaming application that is installed on the initiator device 102, whereas the app instance 116 can be considered as a copy (e.g., an instance) of that videogaming application that is installed on the target device 104.

As still another non-limiting example, the application 210 can be a word processing application. In such case, the app instance 106 can be considered as a copy (e.g., an instance)

of that word processing application that is installed on the initiator device 102, whereas the app instance 116 can be considered as a copy (e.g., an instance) of that word processing application that is installed on the target device 104.

As even another non-limiting example, the application 210 can be a media player application. In such case, the app instance 106 can be considered as a copy (e.g., an instance) of that media player application that is installed on the initiator device 102, whereas the app instance 116 can be considered as a copy (e.g., an instance) of that media player application that is installed on the target device 104.

In any case, the app instance 106 of the application 210 can host, conduct, or otherwise facilitate the session 108. Accordingly, a user can participate in the session 108 by interacting with the initiator device 102 (e.g., by pressing buttons of or using a touchscreen of the initiator device 102).

In various aspects, the target device 104 can comprise a target proximity component 212. In various cases, the target proximity component 212 can electronically determine whether or not the initiator device 102 is within any suitable threshold proximity (e.g., threshold distance) of the target device 104. In various aspects, the target proximity component 212 can perform such determination via any suitable wireless network monitoring techniques. For example, the target device 104 can be connected to any suitable wireless network, such as an NFC network, a PAN, an LAN, an HAN, or a BAN. Accordingly, the target proximity component 212 can electronically monitor such wireless network so as to track which computing devices are connected to the wireless network at any given time. In other words, the target proximity component 212 can detect when or whether another computing device connects to or disconnects from the wireless network. So, if the initiator device 102 is not connected to the wireless network, the target proximity component 212 can determine that the initiator device 102 is not within the threshold proximity of the target device 104. However, if the initiator device 102 is connected to the wireless network, the target proximity component 212 can determine that the initiator device 102 is within the threshold proximity of the target device 104.

In some aspects, the initiator device 102 can make such proximity determination instead of the target device 104. Indeed, in various cases, as shown, the initiator device 102 can comprise an initiator proximity component 214. In various examples, the initiator proximity component 214 can electronically determine, via any suitable wireless network monitoring technique, whether or not the initiator device 102 is within the threshold proximity of the target device 104. If the initiator proximity component 214 determines that the initiator device 102 is within the threshold proximity of the target device 104, then the initiator proximity component 214 can inform the target device 104 of such determination.

In any case, there can be a determination (e.g., by the target proximity component 212 or by the initiator proximity component 214) that the initiator device 102 is within the threshold proximity of (e.g., is physically close enough to) the target device 104.

In various aspects, as shown, the target device 104 can comprise a display component 216. In response to the determination that the initiator device 102 is within the threshold proximity of the target device 104, the display component 216 can electronically render or illustrate the QR code 110 on any suitable electronic display (e.g., on any suitable computer screen or computer monitor) of the target device 104. As mentioned above, the QR code 110 can contain, convey, indicate, represent, or otherwise be correlated to the dock credential 112.

In various aspects, as shown, the initiator device 102 can comprise a scanning component 218. In various cases, the scanning component 218 can optically scan, via any suitable camera of the initiator device 102, the QR code 110. In various examples, the scanning component 218 can implement any suitable cryptographic technique to decrypt, extract, or otherwise read the QR code 110. Accordingly, the scanning component 218 can identify the dock credential 112 by scanning the QR code 110.

In various aspects, as shown, the initiator device 102 can comprise a request component 220. In various cases, the request component 220 can electronically generate the dock request 114 based on the dock credential 112 and based on the session 108. In particular, the dock request 114 can, as mentioned above, be any suitable electronic message. In various aspects, the request component 220 can insert the dock credential 112 into the dock request 114. Furthermore, in various cases, the request component 220 can insert into the dock request 114 session data 222.

In various aspects, the session data 222 can include any suitable information pertaining to the session 108, such as numeric or alphanumeric identifiers corresponding to the session 108, sign-in credentials corresponding to the session 108, session content corresponding to the session 108, or user-preferences corresponding to the session 108.

As a non-limiting example, suppose that the application 210 is a videoconferencing application and that the session 108 is a videoconferencing call. In such case, the session data 222 can include a meeting number uniquely identifying such videoconferencing call, a username or password that grant entry/access to such videoconferencing call, a user-preference that controls a volume level of such videoconferencing call, a user-preference that controls a screen brightness level of such videoconferencing call, or a user-preference that controls a backdrop filter of such videoconferencing call.

As another non-limiting example, suppose that the application 210 is a videogaming application and that the session 108 is a videogame mission. In such case, the session data 222 can include an identifier uniquely identifying such videogame mission, a username or password that grant entry/access to such videogame mission, a level of in-game progress showing how much of such videogame mission has been completed, a user-preference that controls a volume level of such videogame mission, a user-preference that controls a screen brightness level of such videogame mission, or a user-preference that controls which buttons of the initiator device 102 perform which in-game actions for such videogame mission.

As still another non-limiting example, suppose that the application 210 is a word processing application and that the session 108 is a document. In such case, the session data 222 can include an identifier uniquely identifying such document, a username or password that grant entry/access to such document, textual content of such document, a user-preference that controls a screen brightness level of such document, or a user-preference that controls a font or typeface of such document.

As even another non-limiting example, suppose that the application 210 is a media player application and that the session 108 is a media record (e.g., a movie, a song). In such case, the session data 222 can include an identifier uniquely identifying such media record, a username or password that grant entry/access to such media record, a level of playback progress showing how much of such media record has been played, a user-preference that controls a volume level of such media record, a user-preference that controls a screen brightness level of such media record, or a user-preference that controls subtitles of such media record.

In any case, the request component 220 can generate the dock request 114, such that the dock request 114 can include both the dock credential 112 and the session data 222. In various examples, the request component 220 can electronically transmit the dock request 114 to the target device 104. In various cases, the dock request 114 can be considered or otherwise interpreted as an instruction for the target device 104 to resume/continue the session 108.

In various aspects, as shown, the target device 104 can comprise a request validation component 224. In various cases, the request validation component 224 can parse the dock request 114 in search of the dock credential 112. If the request validation component 224 fails to find the dock credential 112 in the dock request 114 (e.g., if the dock request 114 were transmitted by an initiator device that did not scan the QR code 110), then the request validation component 224 can conclude that application docking/migration is not permitted to occur between the initiator device 102 and the target device 104. Accordingly, in such case, the target device 104 can refrain from launching, activating, or otherwise invoking the app instance 116 of the application 210.

However, if the request validation component 224 finds the dock credential 112 in the dock request 114, then the request validation component 224 can conclude that application docking/migration is permitted to occur between the initiator device 102 and the target device 104. Accordingly, in such case, the target device 104 can launch, activate, or otherwise invoke the app instance 116 of the application 210, based on the session data 222, thereby causing the app instance 116 to continue or otherwise resume the session 108.

As a non-limiting example, suppose that the application 210 is a videoconferencing application and that the session 108 is a videoconferencing call. In such case, as mentioned above, the session data 222 can include a meeting number uniquely identifying such videoconferencing call, a username or password that grant entry/access to such videoconferencing call, a user-preference that controls a volume level of such videoconferencing call, a user-preference that controls a screen brightness level of such videoconferencing call, or a user-preference that controls a backdrop filter of such videoconferencing call. Accordingly, the target device 104 can launch the app instance 116 using such meeting number, such username or password, or such user-preferences, so as to join that videoconferencing call.

As another non-limiting example, suppose that the application 210 is a videogaming application and that the session 108 is a videogame mission. In such case, as mentioned above, the session data 222 can include an identifier uniquely identifying such videogame mission, a username or password that grant entry/access to such videogame mission, a level of in-game progress showing how much of such videogame mission has been completed, a user-preference that controls a volume level of such videogame mission, a user-preference that controls a screen brightness level of such videogame mission, or a user-preference that controls which buttons of the initiator device 102 perform which in-game actions for such videogame mission. Accordingly, the target device 104 can launch the app instance 116 using such identifier, such username or password, such level of in-game progress, or such user-preferences, so as to join or otherwise recreate that videogame mission.

As still another non-limiting example, suppose that the application 210 is a word processing application and that the session 108 is a document. In such case, as mentioned above, the session data 222 can include an identifier uniquely identifying such document, a username or password that grant entry/access to such document, textual content of such document, a user-preference that controls a screen brightness level of such document, or a user-preference that controls a font or typeface of such document. Accordingly, the target device 104 can launch the app instance 116 using such identifier, such username or password, such textual content, or such user-preferences, so as to open or otherwise recreate that document.

As even another non-limiting example, suppose that the application 210 is a media player application and that the session 108 is a media record (e.g., a movie, a song). In such case, as mentioned above, the session data 222 can include an identifier uniquely identifying such media record, a username or password that grant entry/access to such media record, a level of playback progress showing how much of such media record has been played, a user-preference that controls a volume level of such media record, a user-preference that controls a screen brightness level of such media record, or a user-preference that controls subtitles of such media record. Accordingly, the target device 104 can launch the app instance 116 using such identifier, such username or password, such level of playback progress, or such user-preferences, so as to open that media record.

By launching in accordance with the session data 222, the app instance 116 can be considered as continuing, resuming, or otherwise carrying-on the session 108. Accordingly, the user can participate in the session 108 by interacting with (e.g., by pressing buttons of or using a touchscreen of) the target device 104.

In some aspects, based on resuming/continuing the session 108, the target device 104 can transmit an electronic message to the initiator device 102, where such electronic message can indicate that launch of the app instance 116 was successful. In various cases, the initiator device 102 can close, cancel, cease, or otherwise deactivate the app instance 106 in response to such electronic message.

Note that, from the perspective of the user of the initiator device 102 and of the target device 104, it can seem that the session 108 automatically migrated (e.g., docked) from the initiator device 102 to the target device 104, without the user having to spend time manually re-logging-in to the session 108.

In various aspects, the display component 216 can electronically render a graphical user-interface 226, based on the session 108. As a non-limiting example, the display component 216 can render the graphical user-interface 226 after receiving the dock request 114 but before launching the app instance 116. In such case, the graphical user-interface 226 can indicate whether or not the session 108 is dockable on the target device 104, or the graphical user-interface 226 can indicate that the session 108 is dockable on the target device 104 and that the session 108 will be resumed/continued upon receipt of user-provided confirmation. As another non-limiting example, the display component 216 can render the graphical user-interface 226 before or after launching the app instance 116, where the graphical user-interface 226 can indicate a set of hardware accessories that are controlled by the target device 104. In such case, the target device 104 can receive user-provided input that selects which hardware accessories are to be allocated to the app instance 116 of the application 210 for performing/conducting the session 108. Based on such user-provided input, the target device 104 can allocate such selected hardware accessories to the session 108 upon or after launching the app instance 116 of the application 210. Various aspects of such non-limiting examples are discussed with respect to FIGS. 3-6.

Figure 3:
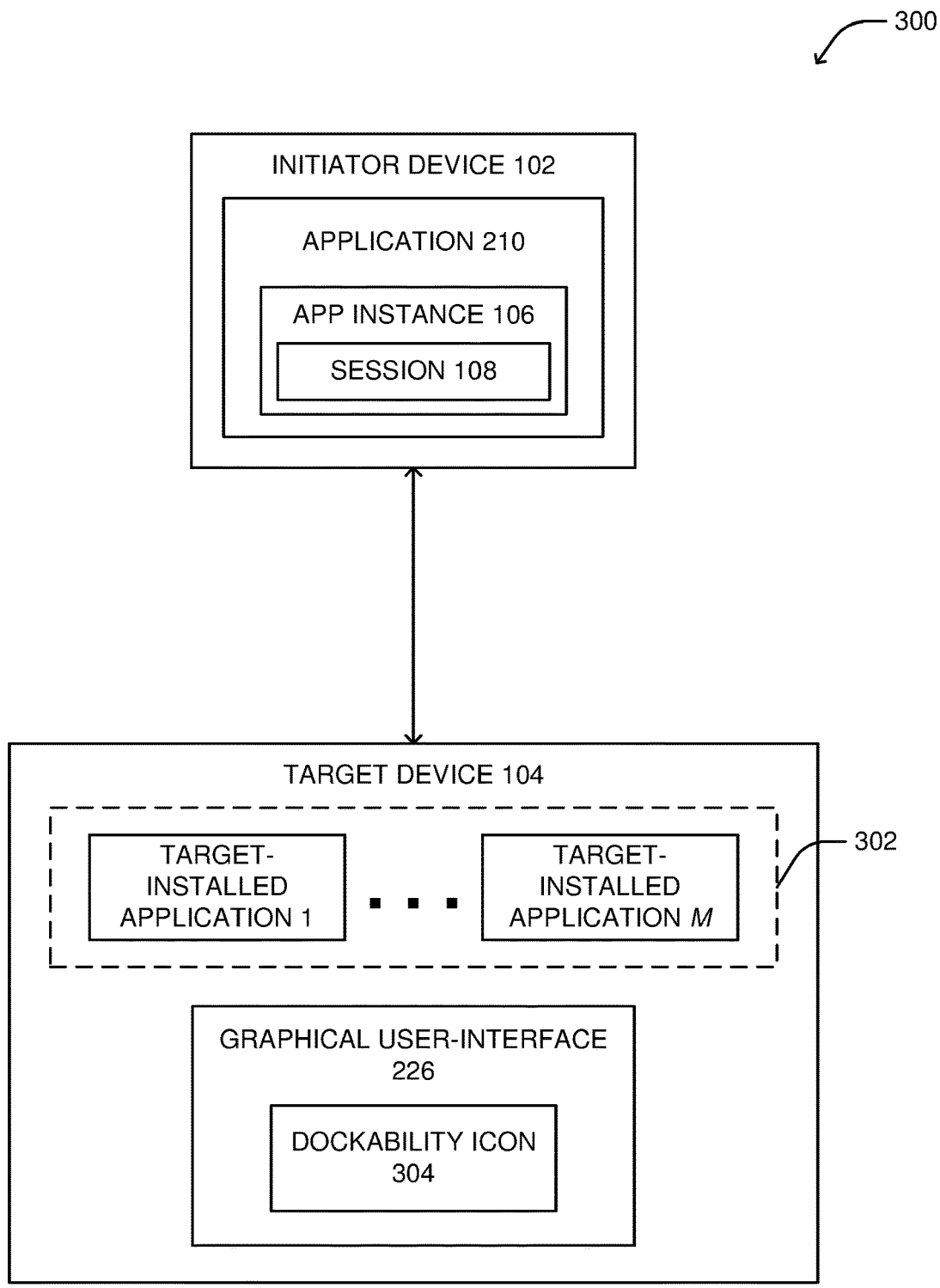
FIGS. 3-4 illustrate non-limiting, example block diagrams pertaining to graphical user-interface dockability icons in accordance with various examples described herein.
Figure 4:
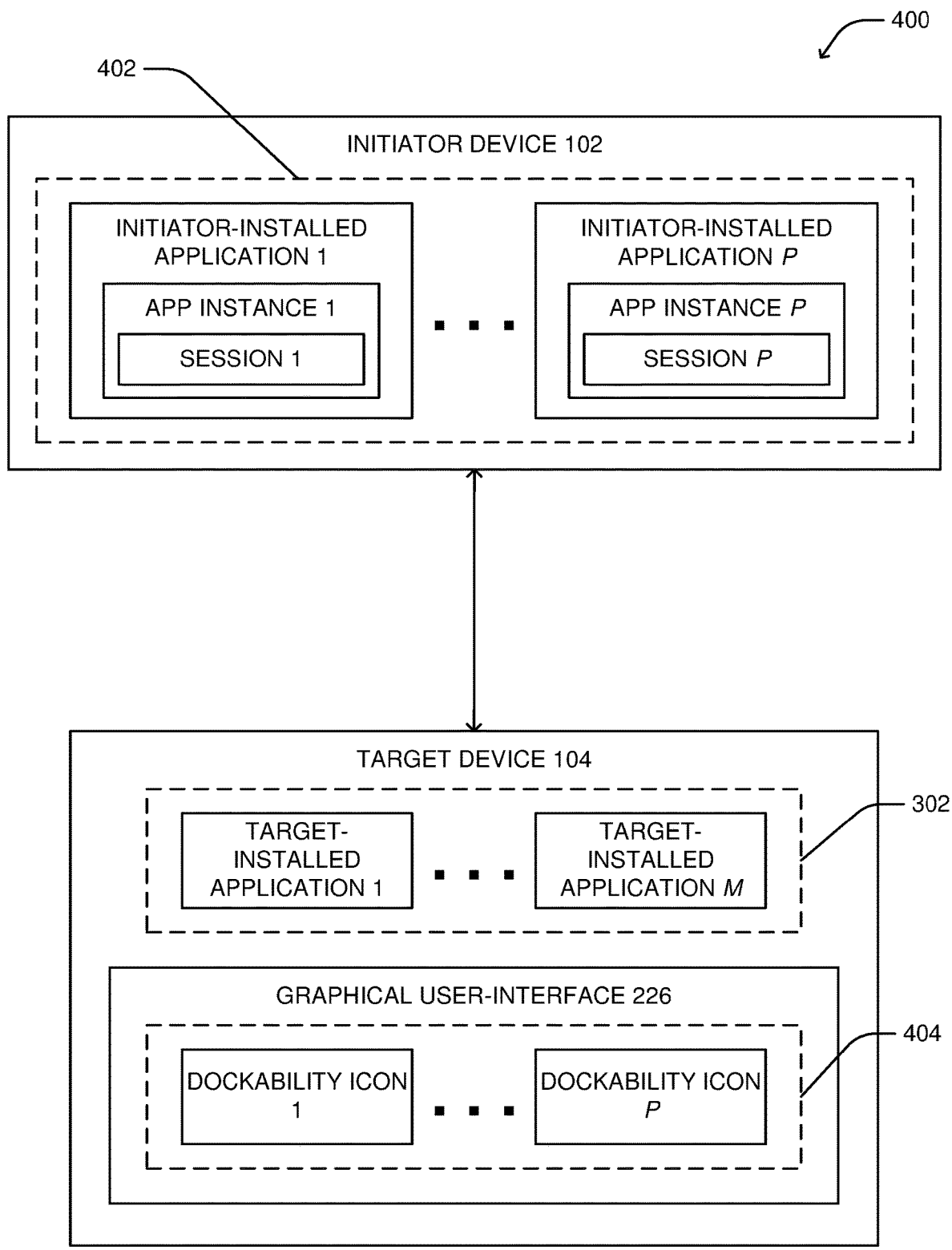

FIGS. 3-4 illustrate non-limiting, example block diagrams 300-400 pertaining to graphical user-interface dockability icons in accordance with various examples described herein.

Consider FIG. 3. In various aspects, as explained above, the app instance 106 of the application 210 can be installed on the initiator device 102. In various cases, as shown, there can be a set of target-installed applications 302. In various examples, the set of target-installed applications 302 can include m applications for any suitable positive integer m: a target-installed application 1 to a target-installed application m. In various aspects, a target-installed application can be any suitable application (e.g., any suitable computing program) an instance of which (e.g., a copy of which) can be installed (e.g., can be already installed) on the target device 104. Accordingly, if an application is not within the set of target-installed applications 302, that application can be considered as not being installed on the target device 104.

In some aspects, after receiving the dock request 114, the target device 104 (e.g., via the request validation component 224) can check whether or not the application 210 (e.g., which can be identified in the session data 222) is within the set of target-installed applications 302. In various cases, the graphical user-interface 226 can include a dockability icon 304, which can be any suitable graphical user-interface element (e.g., a graphical user-interface text field, a graphical user-interface button, or any suitable combination thereof) that can indicate a result of such check.

As a non-limiting example, suppose that the application 210 is not within the set of target-installed applications 302. In such case, the target device 104 (e.g., via the request validation component 224) can conclude that the application 210 is not installed on the target device 104 and thus that the session 108 cannot be migrated/docked to the target device 104. Accordingly, the dockability icon 304 can indicate that the session 108 is not dockable on the target device 104.

As another non-limiting example, suppose that the application 210 is within the set of target-installed applications 302. In such case, the target device 104 (e.g., via the request validation component 224) can conclude that the application 210 is installed on the target device 104 and thus that the session 108 can be migrated/docked to the target device 104. Accordingly, the dockability icon 304 can indicate that the session 108 is dockable on the target device 104. In some cases, the dockability icon 304 can further indicate that the session 108 will be docked/migrated to the target device 104 in response to a user-provided confirmation. In various aspects, the user of the target device 104 can provide such user-provided confirmation by selecting (e.g., via a mouse click or via a touchscreen click) the dockability icon 304.

Now, consider FIG. 4. In various aspects, there can be a set of initiator-installed applications 402. In various examples, the set of initiator-installed applications 402 can include p applications for any suitable positive integer p: an initiator-installed application 1 to an initiator-installed application p. In various aspects, an initiator-installed application can be any suitable application (e.g., any suitable computing program) an instance of which (e.g., a copy of which) can be installed (e.g., can be already installed) on the initiator device 102 and that can be conducting, performing, or otherwise facilitating a session. For example, an app instance 1 of the initiator-installed application 1 can be installed on the initiator device 102 and can conduct a session 1. Similarly, an app instance p of the initiator-installed application p can be installed on the initiator device 102 and can conduct a session p. In other words, the initiator device 102 can, in various cases, host more than one application session at a time. In various aspects, the application 210 can be one of the set of initiator-installed applications 402 (e.g., the session 108 can be one of the session 1 to the session p).

In various examples, the user of the initiator device 102 may want to migrate or dock all of the session 1 to the session p from the initiator device 102 to the target device 104. In such case, the dock request 114 can be considered as including session data for each of the session 1 to the session p. In other words, the dock request 114 can be considered as an instruction for the target device 104 to continue or resume each of the session 1 to the session p.

In various aspects, as mentioned above, after receiving the dock request 114, the target device 104 (e.g., via the request validation component 224) can check whether or not each of the set of initiator-installed applications 402 (e.g., which can be identified in the session data 222) is within the set of target-installed applications 302. In various cases, the graphical user-interface 226 can include a set of dockability icons 404, which can be any suitable graphical user-interface elements that can indicate results of such checks.

In various aspects, the set of dockability icons 404 can respectively correspond (e.g., in one-to-one fashion) to the set of initiator-installed applications 402. Accordingly, since the set of initiator-installed applications 402 can include p applications, the set of dockability icons 404 can include p icons: a dockability icon 1 to a dockability icon p. In particular, the dockability icon 1 can be a graphical user interface element indicating whether or not the initiator-installed application 1 is within the set of target-installed applications 302, and thus indicating whether or not the session 1 is dockable to the target device 104. Likewise, the dockability icon p can be a graphical user interface element indicating whether or not the initiator-installed application p is within the set of target-installed applications 302, and thus indicating whether or not the session p is dockable to the target device 104.

Accordingly, in various aspects, the target device 104 (e.g., via the request validation component 224) can check whether each of the set of initiator-installed applications 402 is within the set of target-installed applications 302, and the display component 216 can generate the set of dockability icons 404 accordingly. As a result, the graphical user-interface 226 (e.g., the set of dockability icons 404) can be considered as indicating which of the session 1 to the session p is dockable from the initiator device 102 to the target device 104. In some cases, if any of the set of dockability icons 404 indicates that a respective one of the session 1 to the session p is dockable to the target device 104, such dockability icon can further indicate that such session will be docked or migrated to the target device 104 in response to a user-provided confirmation. Just as above, the user of the target device 104 can provide such user-provided confirmation by selecting (e.g., via a mouse click or via a touchscreen click) that dockability icon.

Figure 5:
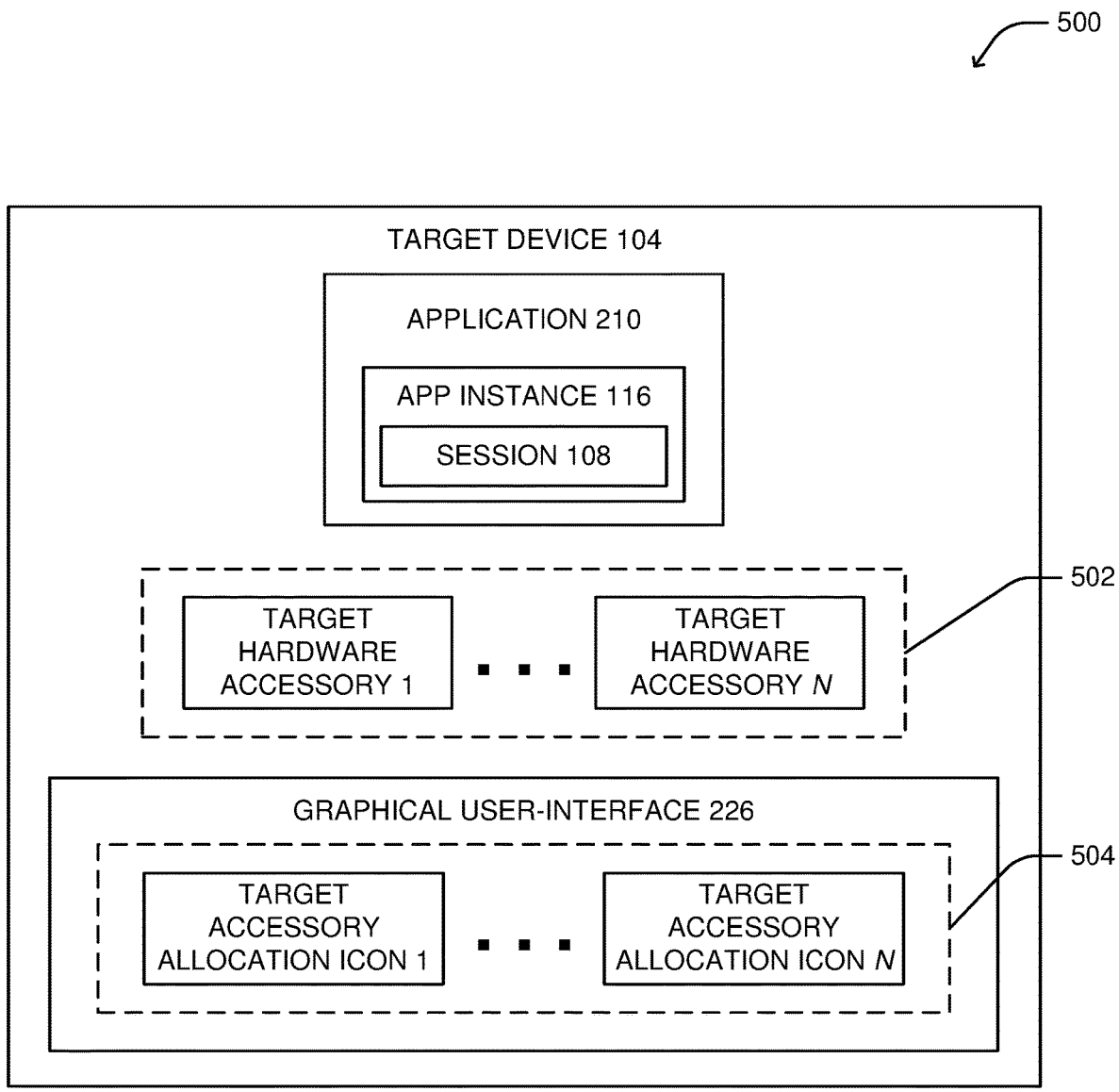
FIGS. 5-6 illustrate non-limiting, example block diagrams pertaining to graphical user-interface accessory allocation icons in accordance with various examples described herein.
Figure 6:
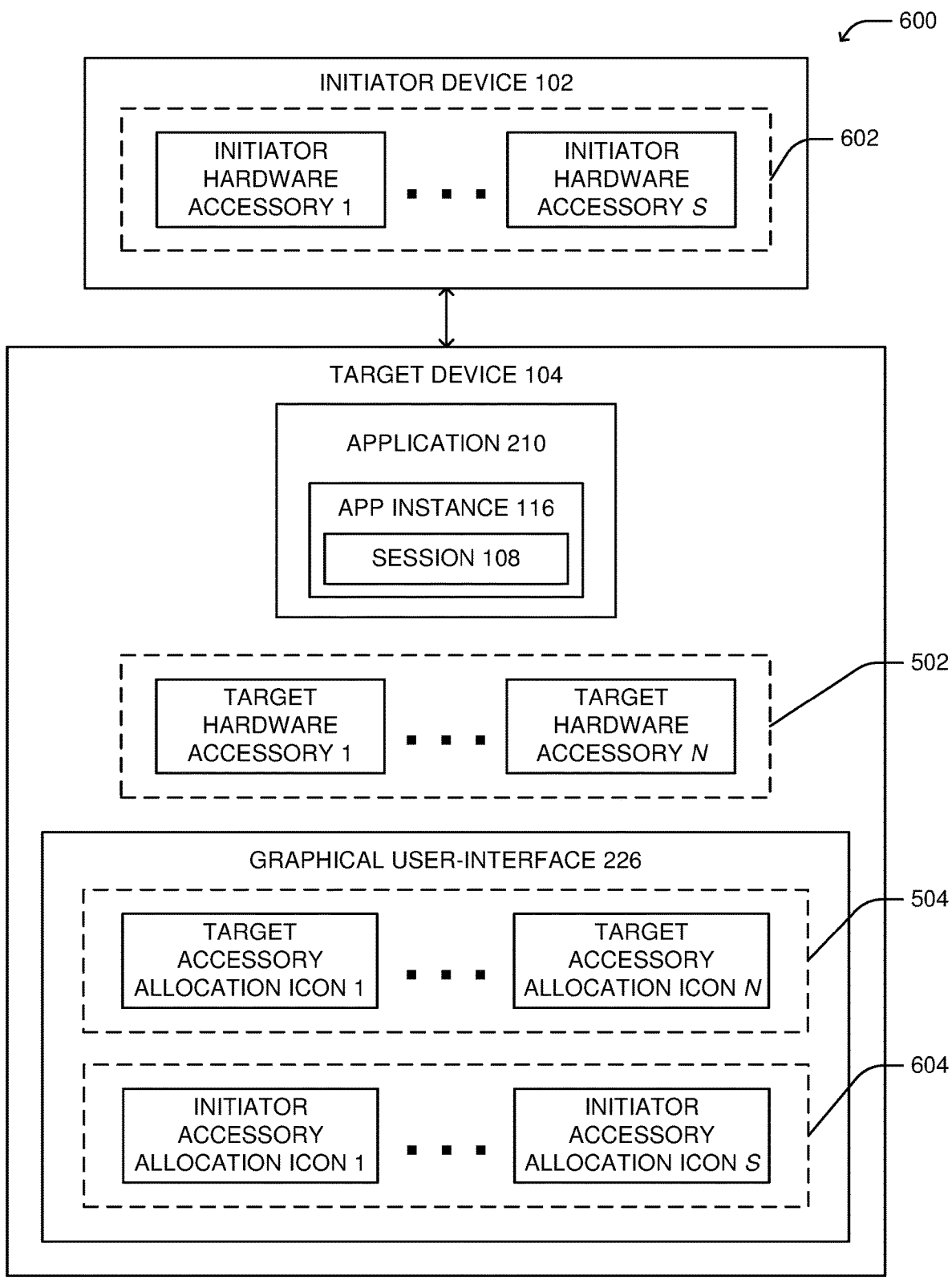

FIGS. 5-6 illustrate non-limiting, example block diagrams 500-600 pertaining to graphical user-interface accessory allocation icons in accordance with various examples described herein.

Consider FIG. 5. In various aspects, as explained above, the app instance 116 of the application 210 can be installed on the target device 104, and the app instance 116 can continue/resume the session 108 by leveraging the session data 222. In various cases, as shown, there can be a set of target hardware accessories 502. In various examples, the set of target hardware accessories 502 can include n accessories for any suitable positive integer n: a target hardware accessory 1 to a target hardware accessory n. In various aspects, a target hardware accessory can be any suitable accessory device that can be integrated into or otherwise coupled (e.g., via a USB connection) to the target device 104. Non-limiting examples of a target hardware accessory can be a pair of headphones, a web camera, a keyboard, a videogame controller, or a lighting array.

In various aspects, the graphical user-interface 226 can include a set of target accessory allocation icons 504. In various cases, the set of target accessory allocation icons 504 can respectively correspond (e.g., in one-to-one fashion) to the set of target hardware accessories 502. Accordingly, since the set of target hardware accessories 502 can include n accessories, the set of target accessory allocation icons 504 can include n icons: a target accessory allocation icon 1 to a target accessory allocation icon n. In various cases, each of the set of target accessory allocation icons 504 can be any suitable graphical user-interface element (e.g., a text field, a button, a combination thereof) that can be invoked to allocate a respective one of the set of target hardware accessories 502 to the session 108 of the app instance 116.

For example, the target accessory allocation icon 1 can correspond to the target hardware accessory 1. Accordingly, the target accessory allocation icon 1 can be a graphical user-interface element that can indicate that the target hardware accessory 1 is allocatable to the session 108 of the app instance 116. Moreover, in various cases, the target device 104 can allocate the target hardware accessory 1 to the session 108 of the app instance 116, in response to selection/invocation of the target accessory allocation icon 1 by the user (e.g., in response to the user clicking on the target accessory allocation icon 1).

As another example, the target accessory allocation icon n can correspond to the target hardware accessory n. Accordingly, the target accessory allocation icon n can be a graphical user-interface element that can indicate that the target hardware accessory n is allocatable to the session 108 of the app instance 116. Moreover, in various cases, the target device 104 can allocate the target hardware accessory n to the session 108 of the app instance 116, in response to selection/invocation of the target accessory allocation icon n by the user (e.g., in response to the user clicking on the target accessory allocation icon n).

In this way, various hardware accessories controlled/governed by the target device 104 can be selectively allocated to the session 108 of the app instance 116.

Now, consider FIG. 6. In various aspects, as mentioned above, there can be the set of target hardware accessories 502 that can be controlled/governed by the target device 104. In various cases, there can likewise be a set of initiator hardware accessories 602 that can be controlled/governed by the initiator device 102. As shown, the set of initiator hardware accessories 602 can include s accessories for any suitable positive integer s: an initiator hardware accessory 1 to an initiator hardware accessory s. In various aspects, an initiator hardware accessory can be any suitable accessory device that can be integrated into or otherwise coupled (e.g., via a USB connection) to the initiator device 102. Non-limiting examples of an initiator hardware accessory can be a pair of headphones, a web camera, a keyboard, a videogame controller, or a lighting array.

In various aspects, the graphical user-interface 226 can include not just the set of target accessory allocation icons 504, but can also include a set of initiator accessory allocation icons 604. In various cases, the set of initiator accessory allocation icons 604 can respectively correspond (e.g., in one-to-one fashion) to the set of initiator hardware accessories 602. Accordingly, since the set of initiator hardware accessories 602 can include s accessories, the set of initiator accessory allocation icons 604 can include s icons: an initiator accessory allocation icon 1 to an initiator accessory allocation icon s. In various cases, each of the set of initiator accessory allocation icons 604 can be any suitable graphical user-interface element (e.g., a text field, a button, a combination thereof) that can be invoked to allocate a respective one of the set of initiator hardware accessories 602 to the session 108 of the app instance 116.

For example, the initiator accessory allocation icon 1 can correspond to the initiator hardware accessory 1. Accordingly, the initiator accessory allocation icon 1 can be a graphical user-interface element that can indicate that the initiator hardware accessory 1 is allocatable to the session 108 of the app instance 116. Moreover, in various cases, the target device 104 can allocate the initiator hardware accessory 1 to the session 108 of the app instance 116, in response to selection/invocation of the initiator accessory allocation icon 1 by the user (e.g., in response to the user clicking on the initiator accessory allocation icon 1). Note that such allocation can be accomplished notwithstanding that the initiator hardware accessory 1 can be plugged or integrated into the initiator device 102 instead of the target device 104. Indeed, whenever the target device 104 has a command/instruction for the initiator hardware accessory 1, the target device 104 can transmit such command/instruction to the initiator device 102, and the initiator device 102 can pass such command/instruction to the initiator hardware accessory 1.

As another example, the initiator accessory allocation icon s can correspond to the initiator hardware accessory s. Thus, the initiator accessory allocation icon s can be a graphical user-interface element that can indicate that the initiator hardware accessory s is allocatable to the session 108 of the app instance 116. Moreover, in various cases, the target device 104 can allocate the initiator hardware accessory s to the session 108 of the app instance 116, in response to selection/invocation of the initiator accessory allocation icon s by the user (e.g., in response to the user clicking on the initiator accessory allocation icon s). Again, note that such allocation can be accomplished notwithstanding that the initiator hardware accessory s can be plugged or integrated into the initiator device 102 instead of the target device 104. Indeed, whenever the target device 104 has a command/instruction for the initiator hardware accessory s, the target device 104 can transmit such command/instruction to the initiator device 102, and the initiator device 102 can pass such command/instruction to the initiator hardware accessory s.

In this way, various hardware accessories controlled/governed by the target device 104 or by the initiator device 102 can be selectively allocated to the session 108 of the app instance 116.

Figure 7:
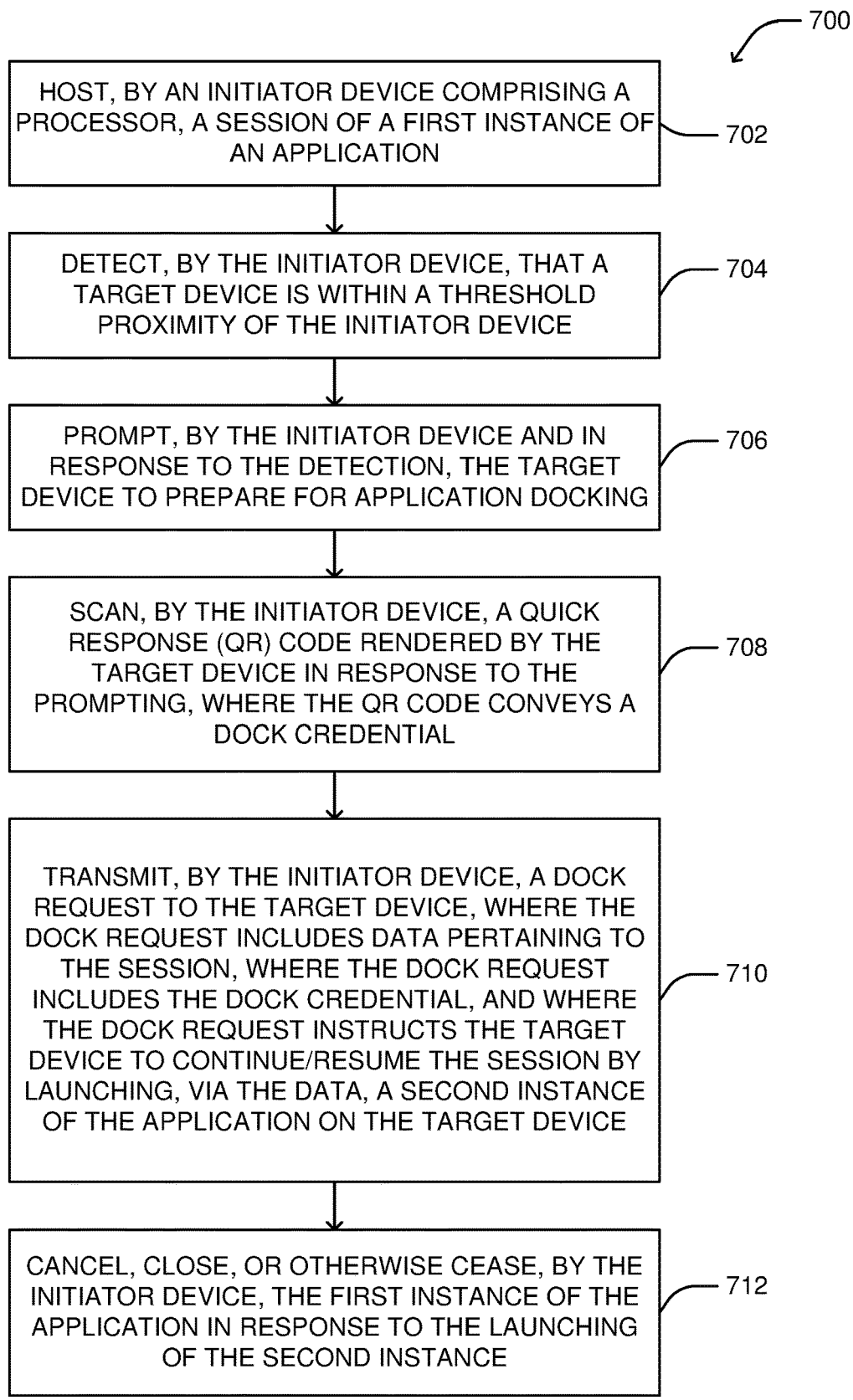
FIG. 7 illustrates a flow diagram of an example, non-limiting computer-implemented method that can facilitate application docking from an initiator device's perspective in accordance with various examples described herein.

FIG. 7 illustrates a flow diagram of an example, non-limiting computer-implemented method 700 that can facilitate application docking from an initiator device's perspective in accordance with various examples described herein. In various cases, the initiator device 102 can facilitate the computer-implemented method 700.

In various aspects, act 702 can include hosting, by an initiator device (e.g., 102) comprising a processor (e.g., 202), a session (e.g., 108) of a first instance (e.g., 106) of an application (e.g., 210).

In various cases, act 704 can include detecting, by the initiator device (e.g., via 214), that a target device (e.g., 104) is within a threshold proximity of the initiator device.

In various aspects, act 706 can include prompting, by the initiator device (e.g., via 214) and in response to such detection, the target device to prepare for application docking.

In various cases, act 708 can include scanning, by the initiator device (e.g., via 218) a QR code (e.g., 110) rendered by the target device in response to the prompting. In various examples, the QR code can convey a dock credential (e.g., 112).

In various aspects, act 710 can include transmitting, by the initiator device (e.g., via 220), a dock request (e.g., 114) to the target device. In various cases, the dock request can include data (e.g., 222) pertaining to the session. In various examples, the dock request can include the dock credential. In various cases, the dock request can instruct the target device to continue/resume the session by launching, via the data, a second instance (e.g., 116) of the application on the target device.

In various aspects, act 712 can include cancelling, closing, or otherwise ceasing, by the initiator device, the first instance of the application in response to the launching of the second instance.

Figure 8:
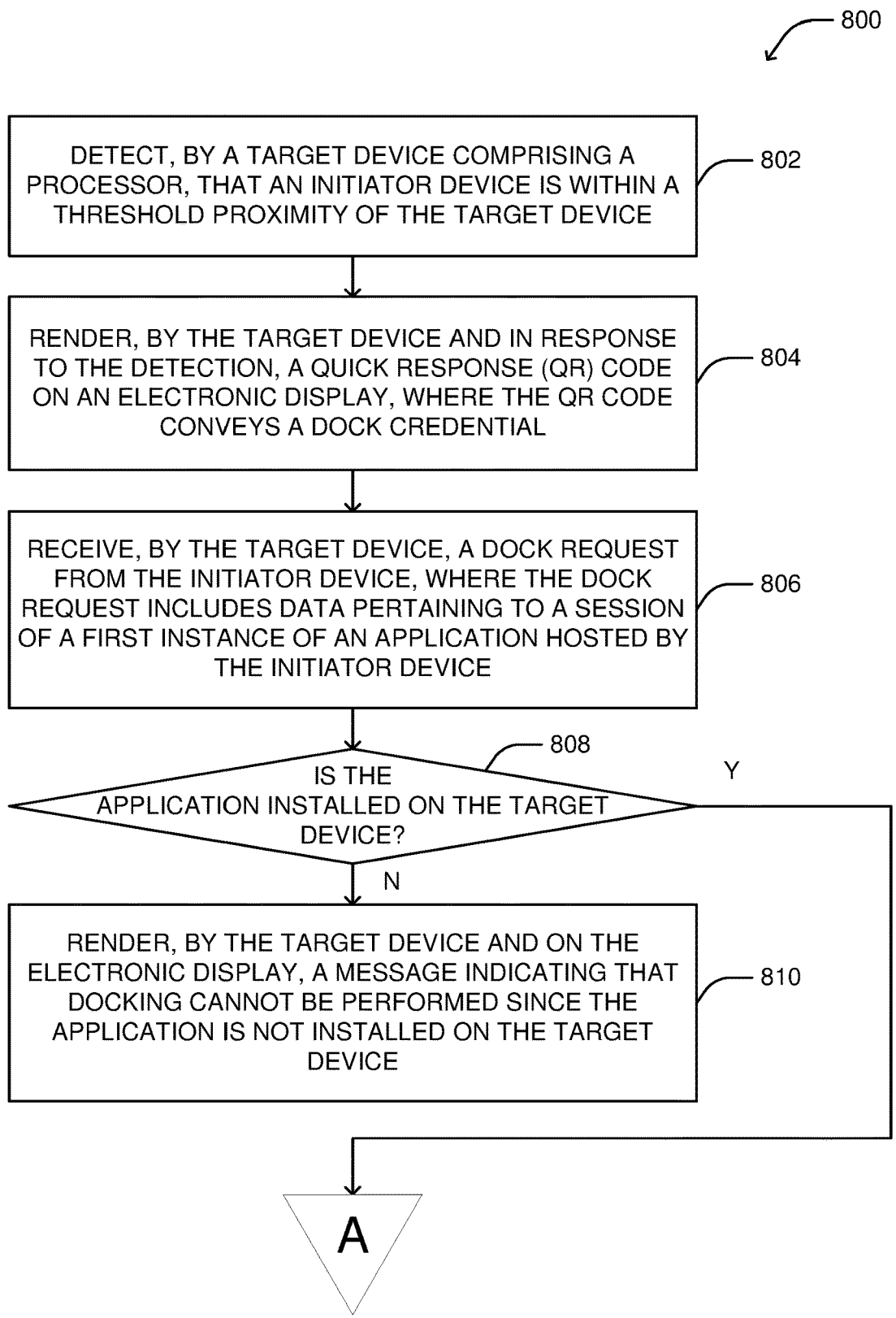
FIGS. 8-9 illustrate flow diagrams of example, non-limiting computer-implemented methods that can facilitate application docking from a target device's perspective in accordance with various examples described herein.
Figure 9:
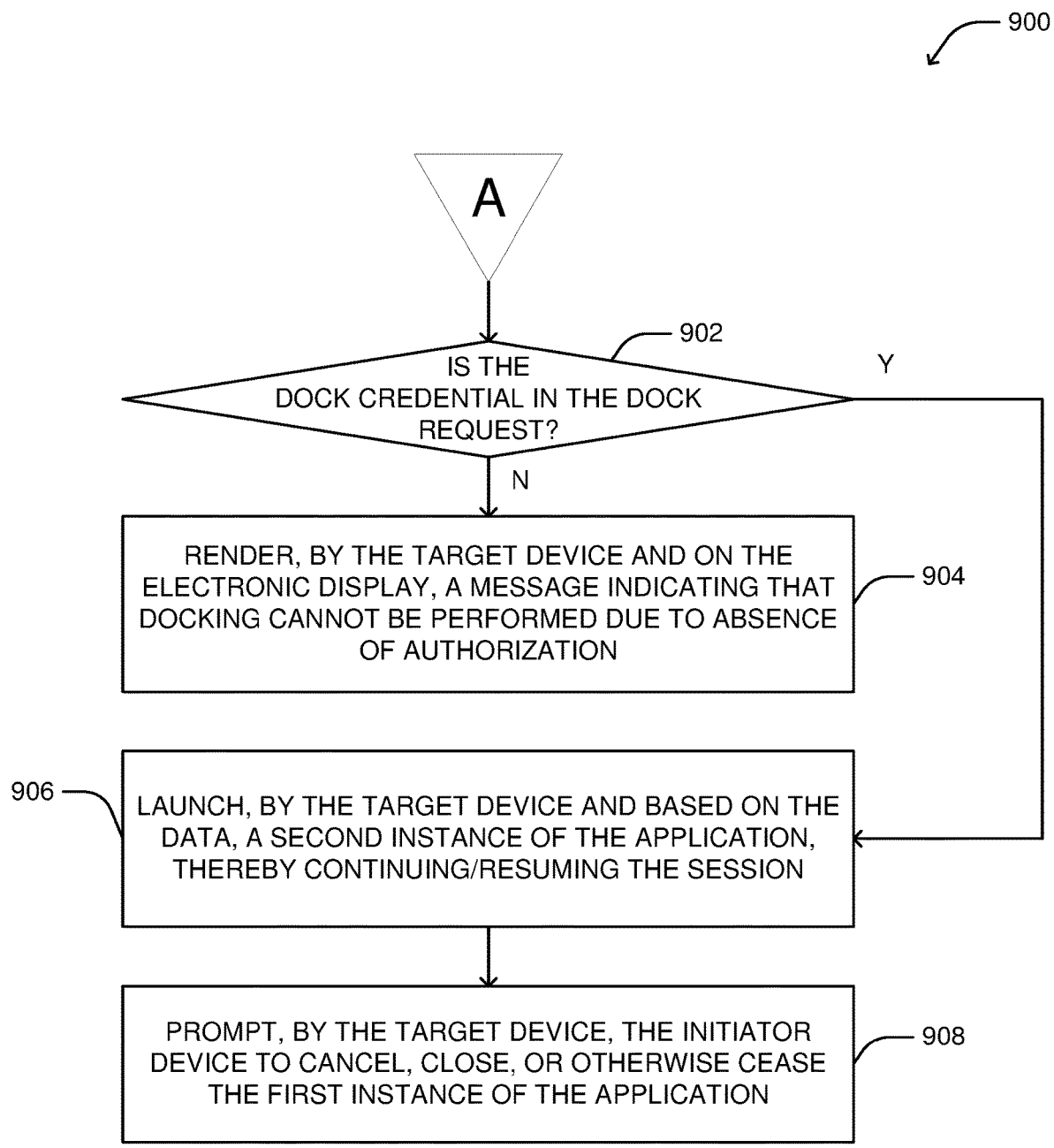

FIGS. 8-9 illustrate flow diagrams of example, non-limiting computer-implemented methods 800-900 that can facilitate application docking from a target device's perspective in accordance with various examples described herein. In various cases, the target device 104 can facilitate the computer-implemented methods 800-900.

In various aspects, act 802 can include detecting, by a target device (e.g., 104, via 212) comprising a processor (e.g., 206), that an initiator device (e.g., 102) is within a threshold proximity of the target device.

In various cases, act 804 can include rendering, by the target device (e.g., via 216) and in response to the detection, a QR code (e.g., 110) on an electronic display. In various examples, the QR code can convey a dock credential (e.g., 112).

In various aspects, act 806 can include receiving, by the target device (e.g., via 224), a dock request (e.g., 114) from the initiator device. In various cases, the dock request can include data (e.g., 222) pertaining to a session (e.g., 108) of a first instance (e.g., 106) of an application (e.g., 210) hosted by the initiator device.

In various examples, act 808 can include determining, by the target device (e.g., via 224), whether the application is installed on the target device. If not, the computer-implemented method 800 can proceed to act 810. If so, the computer-implemented method 800 can instead proceed to act 902 of the computer-implemented method 900.

In various aspects, act 810 can include rendering, by the target device (e.g., via 216) and on the electronic display, a message (e.g., 226) indicating that docking cannot be performed since the application is not installed on the target device.

Now, consider FIG. 9. In various aspects, act 902 can include determining, by the target device (e.g., via 224), whether the dock credential is in the dock request. If not, the computer-implemented method 900 can proceed to act 904. If so, the computer-implemented method 900 can instead proceed to act 906.

In various cases, act 904 can include rendering, by the target device (e.g., via 216) and on the electronic display, a message (e.g., 226) indicating that docking cannot be performed due to absence of authorization.

In various aspects, act 906 can include launching, by the target device (e.g., via 210) and based on the data, a second instance (e.g., 116) of the application, thereby continuing/resuming the session.

In various cases, act 908 can include prompting, by the target device, the initiator device to cancel, close, or otherwise cease the first instance of the application.

Figure 10:
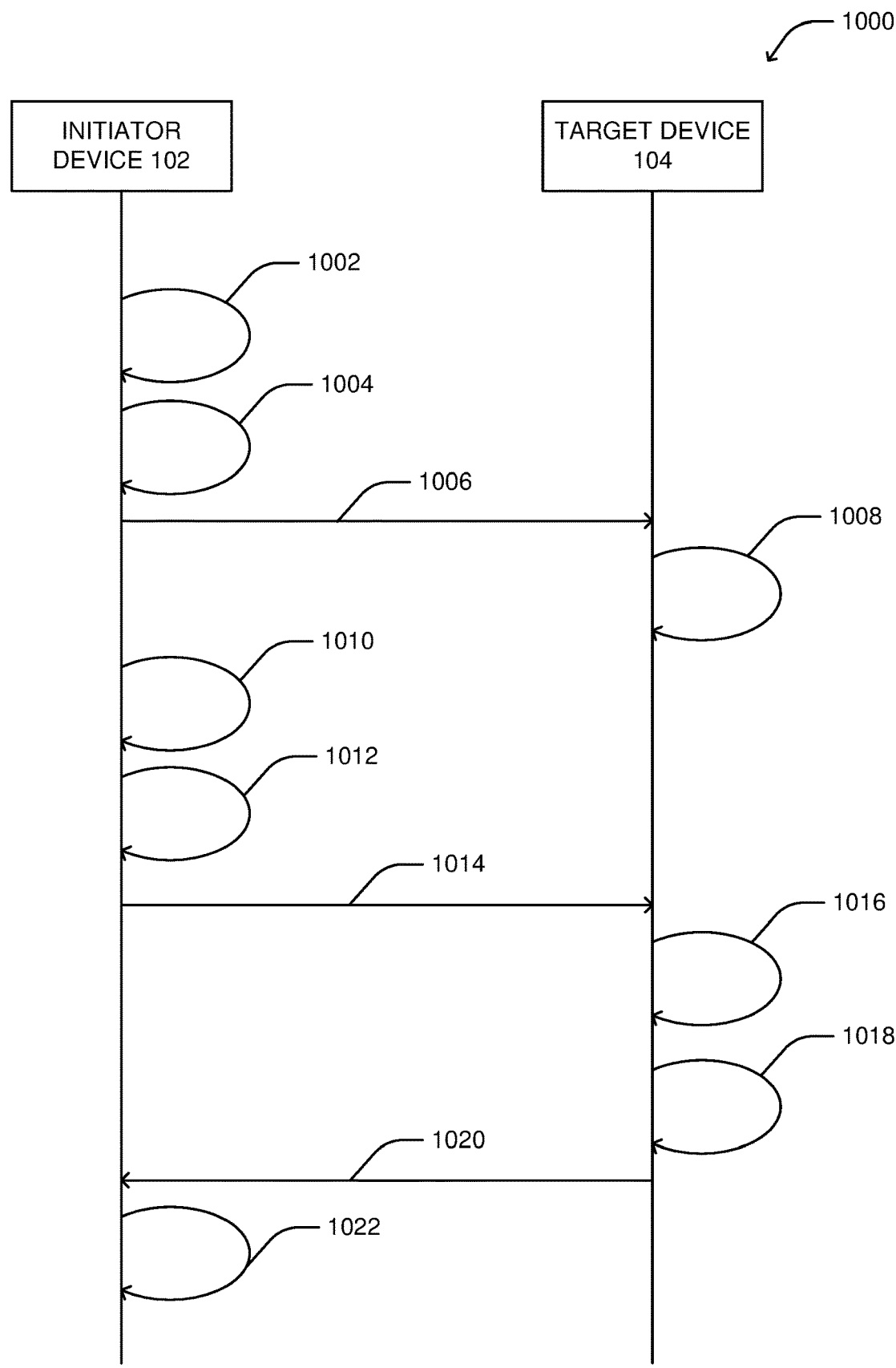
FIGS. 10-11 illustrate non-limiting, example communication diagrams pertaining to application docking in accordance with various examples described herein.
Figure 11:
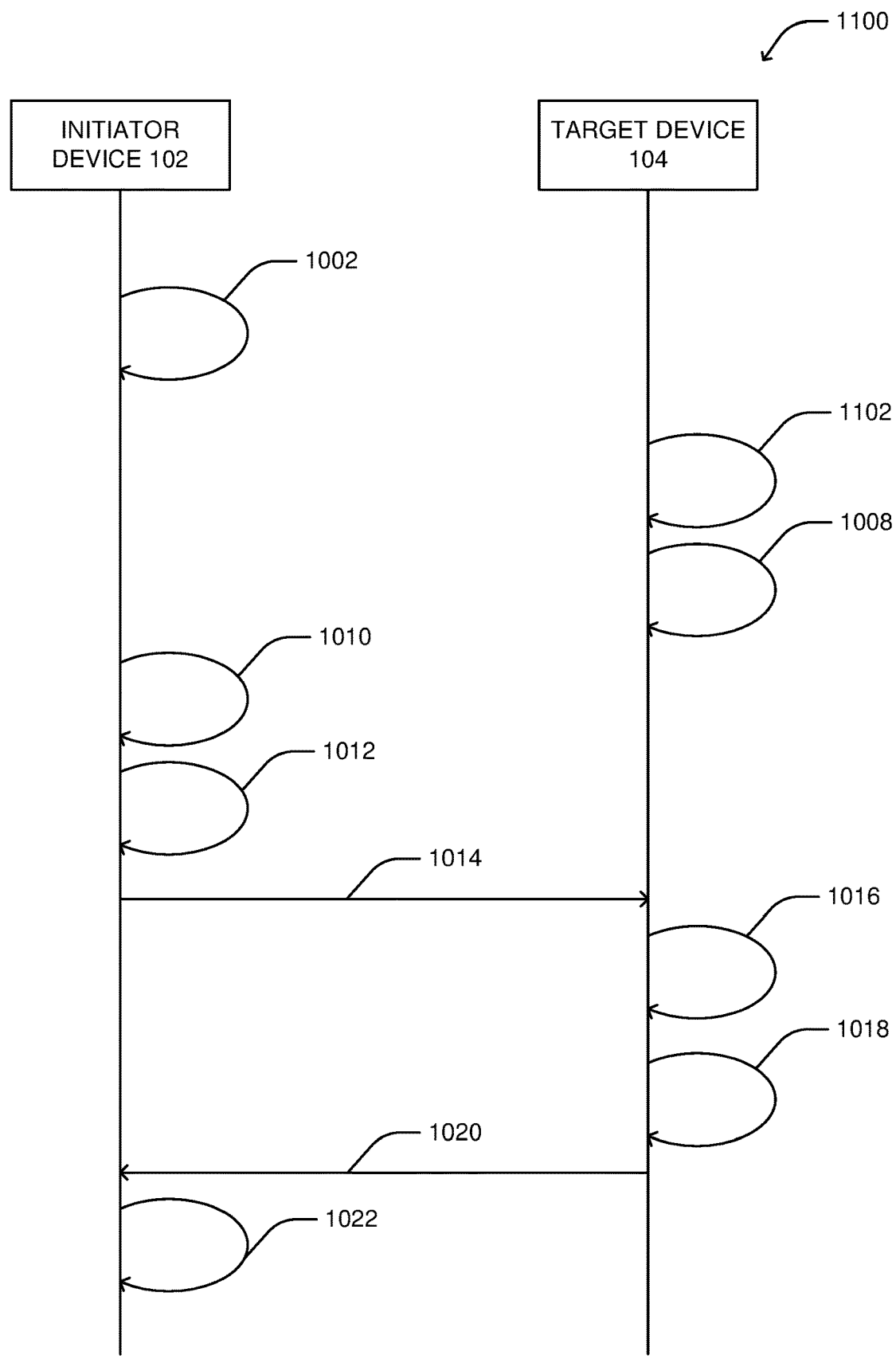

FIGS. 10-11 illustrate non-limiting, example communication diagrams 1000-1100 pertaining to application docking in accordance with various examples described herein.

First, consider FIG. 10. In various examples, the initiator device 102 can, at act 1002, participate in a session (e.g., 108) of a first instance (e.g., 106) of an application (e.g., 210). In various cases, such session can be a videoconferencing session, a videogaming session, a word processing session, or a media playing session.

In various aspects, the initiator device 102 can, at act 1004, detect that the initiator device 102 is within a threshold distance of the target device 104. In various cases, the initiator device 102 can facilitate such detection via any suitable wireless network monitoring technique.

In various examples, the initiator device 102 can, at act 1006, inform, via transmission of any suitable electronic message, the target device 104 that the initiator device 102 is within the threshold distance of the target device 104.

In various cases, the target device 104 can, at act 1008, render the QR code 110 on its electronic display.

In various aspects, the initiator device 102 can, at act 1010, scan or otherwise capture, via a camera of the initiator device 102, the QR code 110. By scanning/capturing the QR code 110, the initiator device 102 can become aware of the dock credential 112.

In various cases, the initiator device 102 can, at act 1012, generate the dock request 114. As explained above, the initiator device 102 can insert the dock credential 112 and the session data 222 into the dock request 114.

In various examples, the initiator device 102 can, at act 1014, transmit the dock request 114 to the target device 104.

In various aspects, the target device 104 can, at act 1016, verify that the dock credential 112 is in the dock request 114. In various cases, the target device 104 can perform any other suitable checks/verifications at this act, such as checking whether the application 210 is already installed on the target device 104.

In various examples, the target device 104 can, at act 1018, launch the app instance 116 of the application 210 based on the session data 222, thereby continuing/resuming the session 108.

In various aspects, the target device 104 can, at act 1020, transmit an electronic message to the initiator device 102, where such electronic message can indicate that the app instance 116 has successfully resumed/continued the session 108.

In various cases, the initiator device 102 can, at act 1022, close the app instance 106 of the application 210, in response to such electronic message.

Now, consider FIG. 11. In various aspects, acts 1002 and 1008-1022 can be as described above. However, in various cases, acts 1004-1006 can be replaced by an act 1102. In various examples, the target device 104 can, at act 1102, detect that the initiator device 102 is within a threshold distance of the target device 104. In various cases, the target device 104 can facilitate such detection via any suitable wireless network monitoring technique. In various aspects, the target device 104 can then render, at act 1008, the QR code 110 in response to such proximity detection.

Thus far, various examples have been described in which application docking can be facilitated directly between the initiator device 102 and the target device 104. However, these are mere non-limiting examples. In various other aspects, there can be an intermediary device that can control or otherwise govern a set of target devices, and the initiator device can facilitate application docking by interacting with the intermediary device, as opposed to directly interacting with the set of target devices. Such non-limiting examples are described with respect to FIGS. 12-14.

Figure 12:
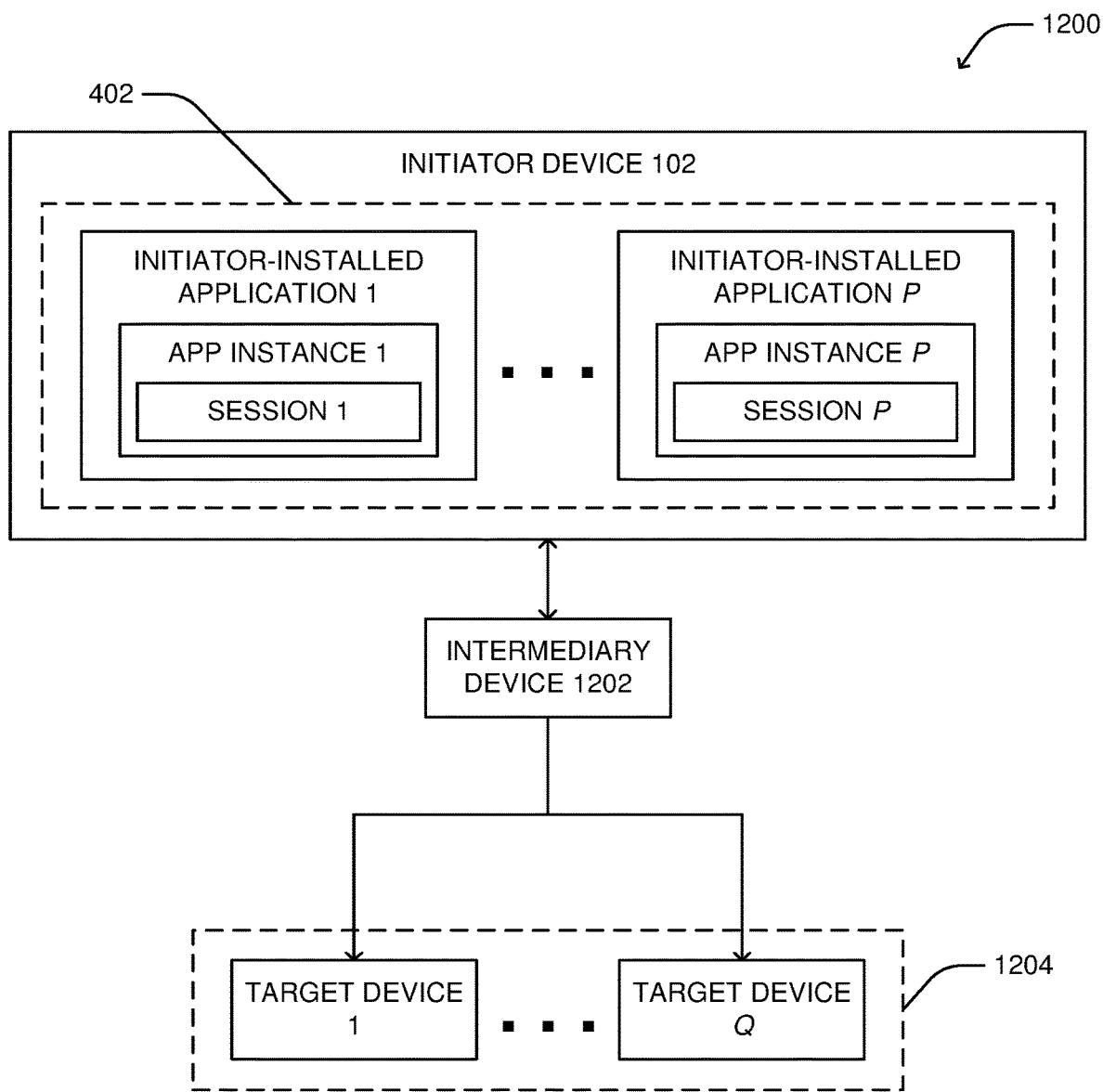
FIG. 12 illustrates a block diagram of an example, non-limiting apparatus including an intermediary device controlling a set of target devices that can facilitate application docking in accordance with various examples described herein.

FIG. 12 illustrates a block diagram of an example, non-limiting apparatus 1200 including an intermediary device controlling a set of target devices that can facilitate application docking in accordance with various examples described herein.

In various aspects, there can be an intermediary device 1202. In various cases, the intermediary device 1202 can be any suitable computing device that can comprise a processor and a non-transitory computer-readable memory. In various examples, the intermediary device 1202 can be considered as controlling or otherwise governing a set of target devices 1204. In various aspects, the set of target devices 1204 can include q target devices for any suitable positive integer q: a target device 1 to a target device q. In various cases, the target device 104 can be one of the set of target devices 1204. As a non-limiting example, the intermediary device 1202 can be HP Device Bridge.

In various aspects, as mentioned above, the initiator device 102 can host or otherwise conduct multiple application sessions at a given time. In particular, instances of the set of initiator-installed applications 402 can be installed on the initiator device 102, each of which can conduct/perform a respective session. This can result in the initiator device 102 performing/conducting the session 1 to the session p. In various aspects, the user of the initiator device 102 may want to dock various ones of the session 1 to the session p on various ones of the set of target devices 1204. In various cases, such docking can be facilitated as follows.

In various aspects, it can be determined that the initiator device 102 is within a threshold proximity of the intermediary device 1202. In some cases, the initiator device 102 can perform this determination as described above (e.g., via any suitable wireless network monitoring technique). However, in other cases, the intermediary device 1202 can perform this determination via nay suitable wireless network monitoring technique.

In response to such determination, the intermediary device 1202 can render the QR code 110 on any suitable electronic display.

Just as described above, the initiator device 102 can scan/capture the QR code 110 (e.g., can optically scan the electronic display of the intermediary device 1202), and can accordingly generate the dock request 114. Note that, because the initiator device 102 can be conducting/performing the session 1 to the session p, the session data 222 of the dock request 114 can include data (e.g., identifiers, credentials, session content, user-preferences) for each of the session 1 to the session p. In various cases, the initiator device 102 can transmit the dock request 114 to the intermediary device 1202.

In various aspects, the intermediary device 1202 can verify whether the dock request 114 includes the dock credential 112. If the intermediary device 1202 determines that the dock request 114 does not include the dock credential 112 (e.g., if the dock request 114 were generated by an initiator device that did not scan the QR code 110), then the intermediary device 1202 can render a graphical user-interface on its electronic display, where such graphical user-interface can indicate that application docking is prohibited due to lack of permission/authorization.

In contrast, if the intermediary device 1202 determines that the dock request 114 includes the dock credential 112, then the intermediary device 1202 can render a graphical user-interface on its electronic display, where such graphical user-interface can include selectable icons respectively corresponding to the set of target devices 1204 or to the sessions being conducted/performed by the set of initiator-installed applications 402. In various cases, such selectable icons can be selected (e.g., clicked, invoked) by the user, so as to select which sessions are to be docked to which target devices. For example, the user can interact with the graphical user-interface of the intermediary device 1202, so as to select which of the set of target devices 1204 is to continue/resume the session 1. Likewise, the user can interact with the graphical user-interface of the intermediary device 1202, so as to select which of the set of target devices 1204 is to continue/resume the session p. In this way, the intermediary device 1202 can receive user-provided input identifying which sessions are supposed to be docked to which target devices. In various aspects, in response to receiving such user-provided input, the intermediary device 1202 can instruct the set of target devices 1204 to dock the sessions accordingly.

Note that, in some cases, a target device from the set of target devices 1204 can dock more than one of the session 1 to the session p (e.g., such target device can have been selected multiple times by the user-provided input). Furthermore, note that, in some cases, a target device from the set of target devices 1204 can dock none of the session 1 to the session p (e.g., such target device can have been not selected by the user-provided input).

In various aspects, upon or after resumption of the session 1 to the session p by the set of target devices 1204, the intermediary device 1202 can allocate hardware accessories among the session 1 to the session p in accordance with any suitable user-provided input. As a non-limiting example, each of the set of target devices 1204 can be integrated with or otherwise associated with various hardware accessories (e.g., similar to as described with respect to FIG. 5). In various aspects, the intermediary device 1202 can render on its electronic display a graphical user-interface, where such graphical user-interface can indicate selectable icons corresponding to such hardware accessories (e.g., similar to as described with respect to FIG. 5). In various cases, such selectable icons can be selected (e.g., clicked, invoked) by the user, so as to select which hardware accessories are to be allocated to which of the session 1 to the session p resumed/continued by the set of target devices 1204. For example, the user can interact with the graphical user-interface of the intermediary device 1202, so as to select which hardware accessories are to be allocated to the session 1 (e.g., are to be allocated to the target device that has continued/resumed the session 1). Likewise, the user can interact with the graphical user-interface of the intermediary device 1202, so as to select which hardware accessories are to be allocated to the session p (e.g., are to be allocated to the target device that has continued/resumed the session p). In this way, the intermediary device 1202 can receive user-provided input identifying which hardware accessories of the set of target devices 1204 are supposed to be allocated to which of the session 1 to the session p. In various aspects, in response to receiving such user-provided input, the intermediary device 1202 can allocate such hardware accessories accordingly.

Note that, as explained above, it can be possible for an initiator hardware accessory (e.g., one of 602) to be used/leveraged by the target device 104 (e.g., the target device 104 can transmit an instruction/command to the initiator device 102, and the initiator device 102 can pass that instruction/command to the appropriate initiator hardware accessory). In like fashion, it can be possible for a first target device of the set of target devices 1204 to use/leverage a hardware accessory of a second target device of the set of target devices 1204. In particular, whenever the first target device generates a command/instruction for a hardware accessory that is coupled to or integrated in the second target device, the first target device can transmit that command/instruction to the intermediary device 1202, the intermediary device 1202 can pass such command/instruction to the second target device, and the second target device can pass that command/instruction to the hardware accessory.

Furthermore, note that, in various aspects, the intermediary device 1202 can render, on its electronic display, any examples of the graphical user-interface 226.

Figure 13:
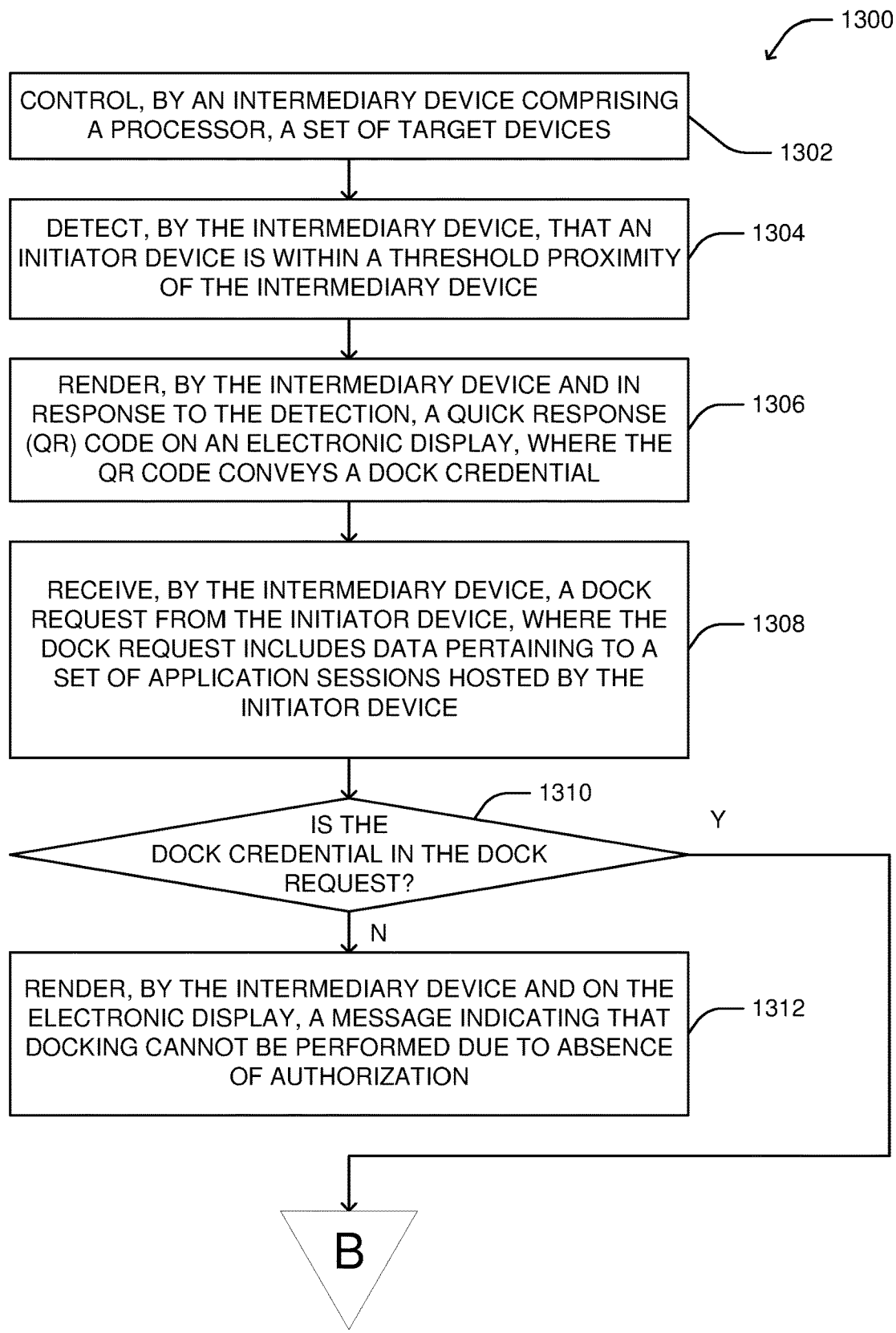
FIGS. 13-14 illustrate flow diagrams of example, non-limiting computer-implemented methods that can facilitate application docking in accordance with various examples involving an intermediary device controlling a set of target devices described herein.
Figure 14:
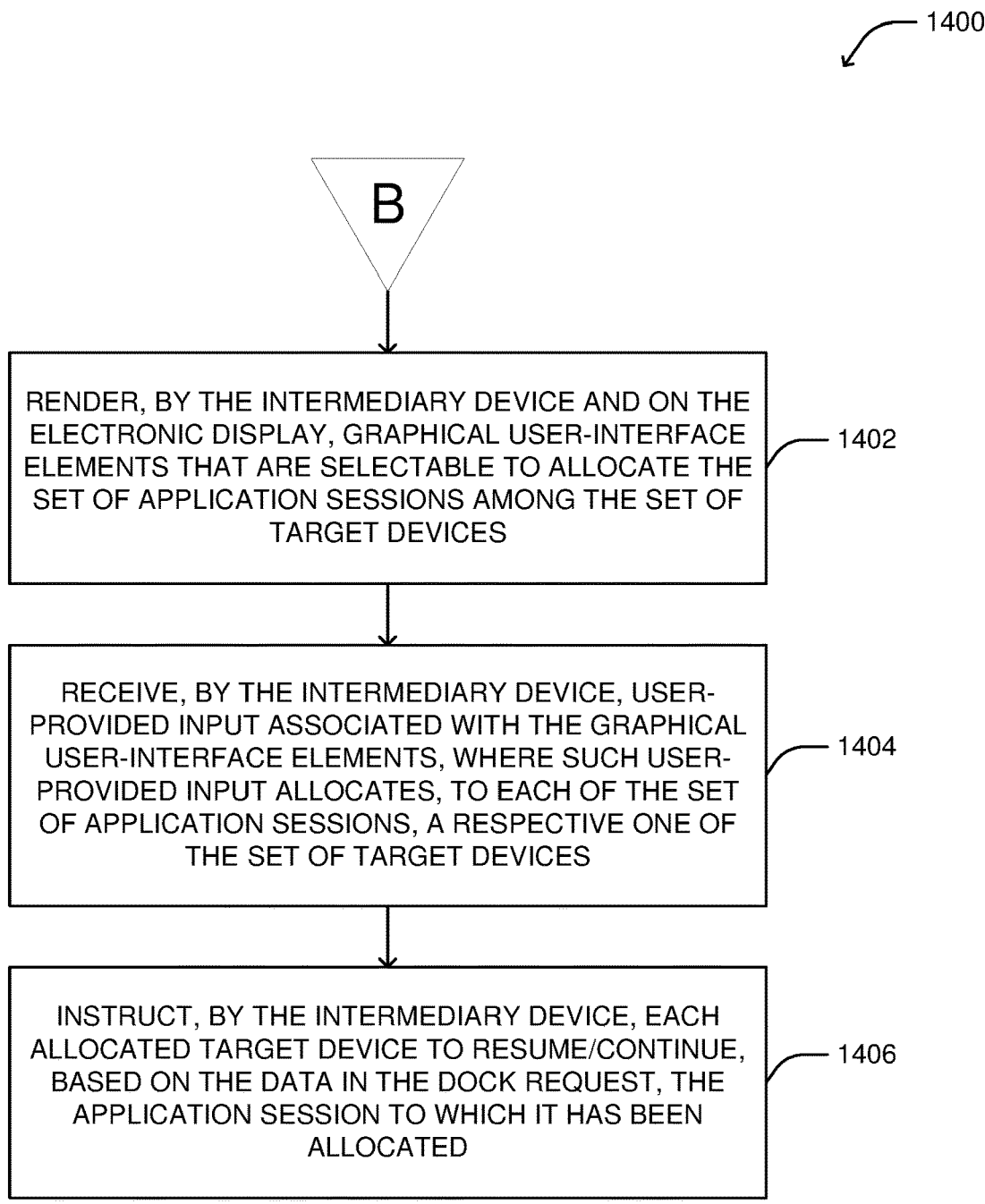

FIGS. 13-14 illustrate flow diagrams of example, non-limiting computer-implemented methods 1300-1400 that can facilitate application docking in accordance with various examples involving an intermediary device controlling a set of target devices described herein. In various cases, the intermediary device 1202 can facilitate the computer-implemented method 1300-1400.

First, consider the computer-implemented method 1300. In various aspects, act 1302 can include controlling, by an intermediary device (e.g., 1202) comprising a processor, a set of target devices (e.g., 1204).

In various cases, act 1304 can include detecting, by the intermediary device, that an initiator device (e.g., 102) is within a threshold proximity of the intermediary device.

In various examples, act 1306 can include rendering, by the intermediary device and in response to such detection, a QR code (e.g., 110) on an electronic display. In various cases, the QR code can convey a dock credential (e.g., 112).

In various aspects, act 1308 can include receiving, by the intermediary device, a dock request (e.g., 114) from the initiator device. In various cases, the dock request can include data (e.g., 222) pertaining to a set of application sessions (e.g., the session 1 to the session p, collectively conducted by the set of initiator-installed applications 402) hosted by the initiator device.

In various examples, act 1310 can include determining, by the intermediary device, whether the dock credential is in the dock request. If not, the computer-implemented method 1300 can proceed to act 1312. If so, the computer-implemented method 1300 can proceed to act 1402 of the computer-implemented method 1400.

In various aspects, act 1312 can include rendering, by the intermediary device and on the electronic display, a message (e.g., 226) indicating that docking cannot be performed due to absence of authorization.

Now, consider the computer-implemented method 1400. In various aspects, act 1402 can include rendering, by the intermediary device and on the electronic display, graphical user-interface elements that can be selectable to allocate the set of application sessions among the set of target devices.

In various cases, act 1404 can include receiving, by the intermediary device, user-provided input associated with the graphical user-interface elements. In various examples, such user-provided input can allocate, to each of the set of application sessions, a respective one of the set of target devices.

In various aspects, act 1406 can include instructing, by the intermediary device, each allocated target device to resume/continue, based on the data in the dock request, the application session to which its has been allocated.

FIGS. 15-16 illustrate flow diagrams of example, non-limiting computer-implemented methods 1500-1600 that can facilitate application docking in accordance with various examples described herein. In various cases, the initiator device 102 can facilitate the computer-implemented methods 1500-1600.

First, consider the computer-implemented method 1500. In various aspects, act 1502 can include transmitting, by an initiator device (e.g., 102, via 218) comprising a processor (e.g., 202) and to a target device (e.g., 104), a dock request (e.g., 114). In various cases, the dock request can indicate a session (e.g., 108) of a first instance (e.g., 106) of an application (e.g., 210) of the initiator device. In various examples, the dock request can instruct the target device to launch a second instance (e.g., 116) of the application to continue the session. In various cases, the transmitting can be in response to a detection of a QR code (e.g., 110) generated by the target device.

Now, consider the computer-implemented method 1600. In various aspects, the computer-implemented method 1600 can include the act 1502. In various cases, and as denoted by numeral 1602, the act 1502 can be based on: prompting, by the initiator device (e.g., via 214) and based on a determination that the initiator device is within a threshold distance of the target device, the target device to render the QR code; scanning, by the initiator device (e.g., via 216), the QR code, wherein the QR code can indicate a dock credential (e.g., 112); and inserting, by the initiator device (e.g., via 218), the dock credential in the dock request.

In various aspects, act 1604 can include cancelling, by the initiator device, the first instance, based on the launch of the second instance.

FIGS. 17-20 illustrate block diagrams 1700-2000 of example, non-limiting non-transitory machine-readable storage media that can facilitate application docking in accordance with various examples described herein.

Figure 17:
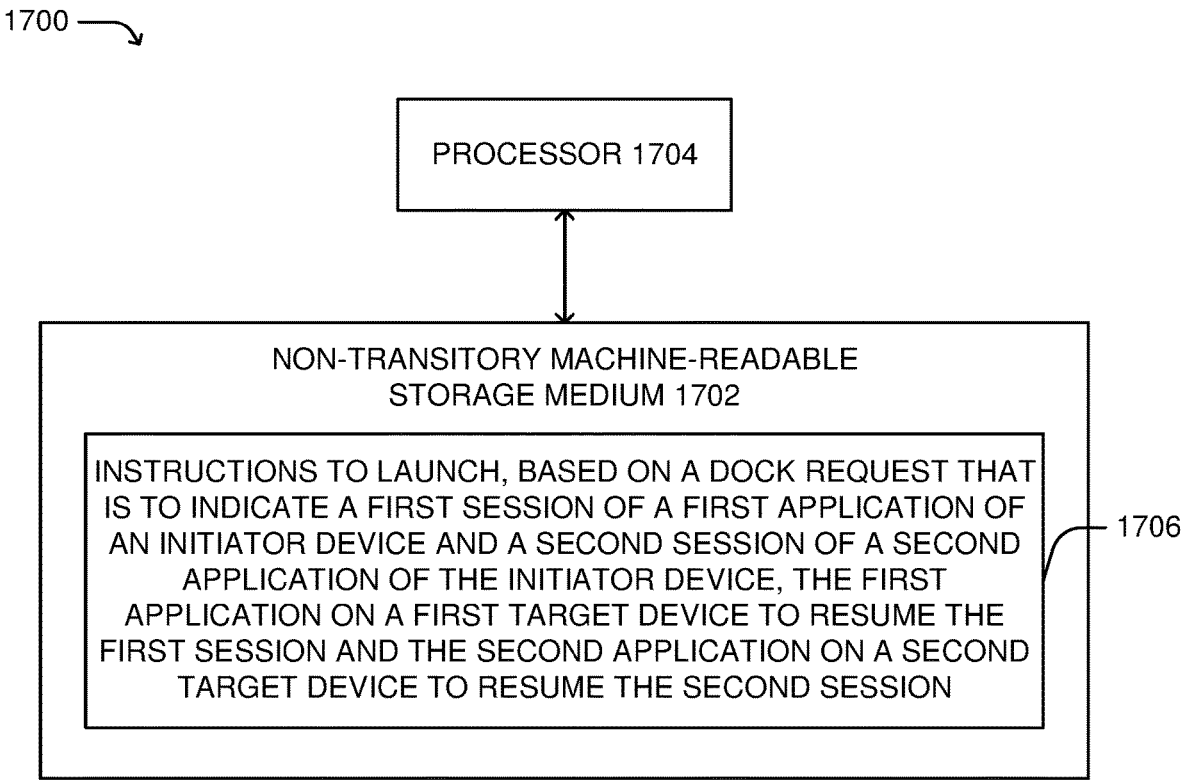
FIGS. 17-20 illustrate block diagrams of example, non-limiting non-transitory machine-readable storage media that can facilitate application docking in accordance with various examples described herein.

First, consider the non-limiting block diagram 1700 of FIG. 17. As shown, there can be a non-transitory machine-readable storage medium 1702. In various aspects, the non-transitory machine-readable storage medium 1702 can include a single form of computer memory or multiple forms of computer memory. In various instances, the non-transitory machine-readable storage medium 1702 can be an electronic, magnetic, optical, or other physical storage device that stores executable non-transitory machine-readable storage media instructions. Thus, the non-transitory machine-readable storage medium 1702 may be, for example, RAM, an electrically-erasable programmable read-only memory ("EEPROM"), a storage drive, an optical disc, or the like. In various cases, the non-transitory machine-readable storage medium 1702 can be electronically integrated, via any suitable wired or wireless electronic connection, with a processor 1704. In various aspects, the non-transitory machine-readable storage medium 1702 can electronically store or maintain any suitable machine-readable instructions, and the processor 1704 can electronically execute or perform such machine-readable instructions.

In various examples, the intermediary device 1202 can comprise the non-transitory machine-readable storage medium 1702 and the processor 1704.

In various aspects, the non-transitory machine-readable storage medium 1702 can comprise instructions 1706. In various examples, the instructions 1706 can be instructions to launch, based on a dock request (e.g., 114) that is to indicate a first session (e.g., one of the session 1 to the session p) of a first application (e.g., one of 402) of an initiator device (e.g., 102) and a second session (e.g., another of the session 1 to the session p) of a second application (e.g., another of 402) of the initiator device, the first application on a first target device (e.g., one of 1204) to resume the first session and the second application on a second target device (e.g., another of 1204) to resume the second session.

Figure 18:
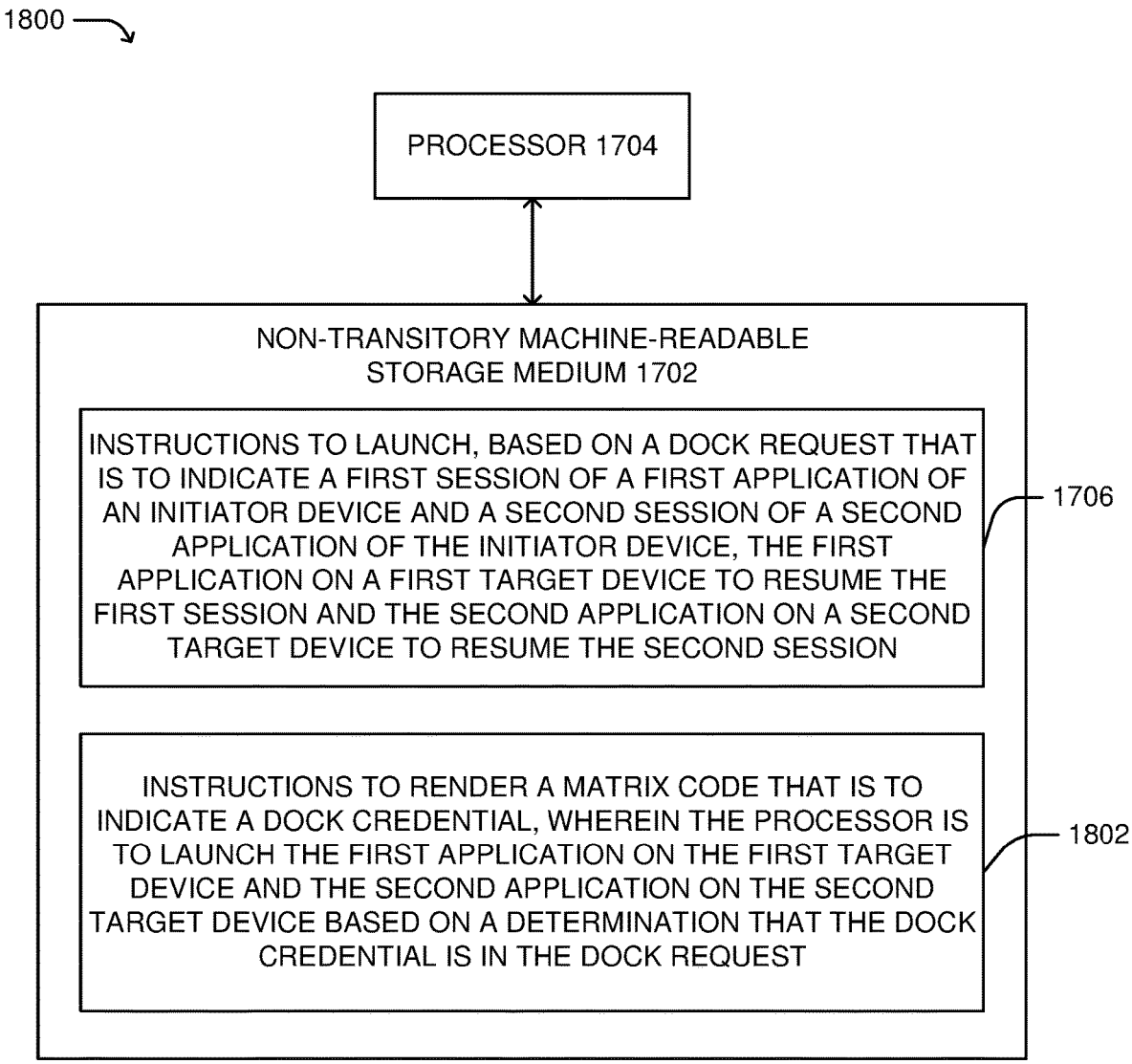

Now, consider the non-limiting block diagram 1800 of FIG. 18. In various aspects, the non-transitory machine-readable storage medium 1702 can comprise instructions 1802. In various cases, the instructions 1802 can be instructions to render a matrix code (e.g., 110) that is to indicate a dock credential (e.g., 112), wherein the processor is to launch the first application on the first target device and the second application on the second target device based on a determination that the dock credential is in the dock request.

Figure 19:
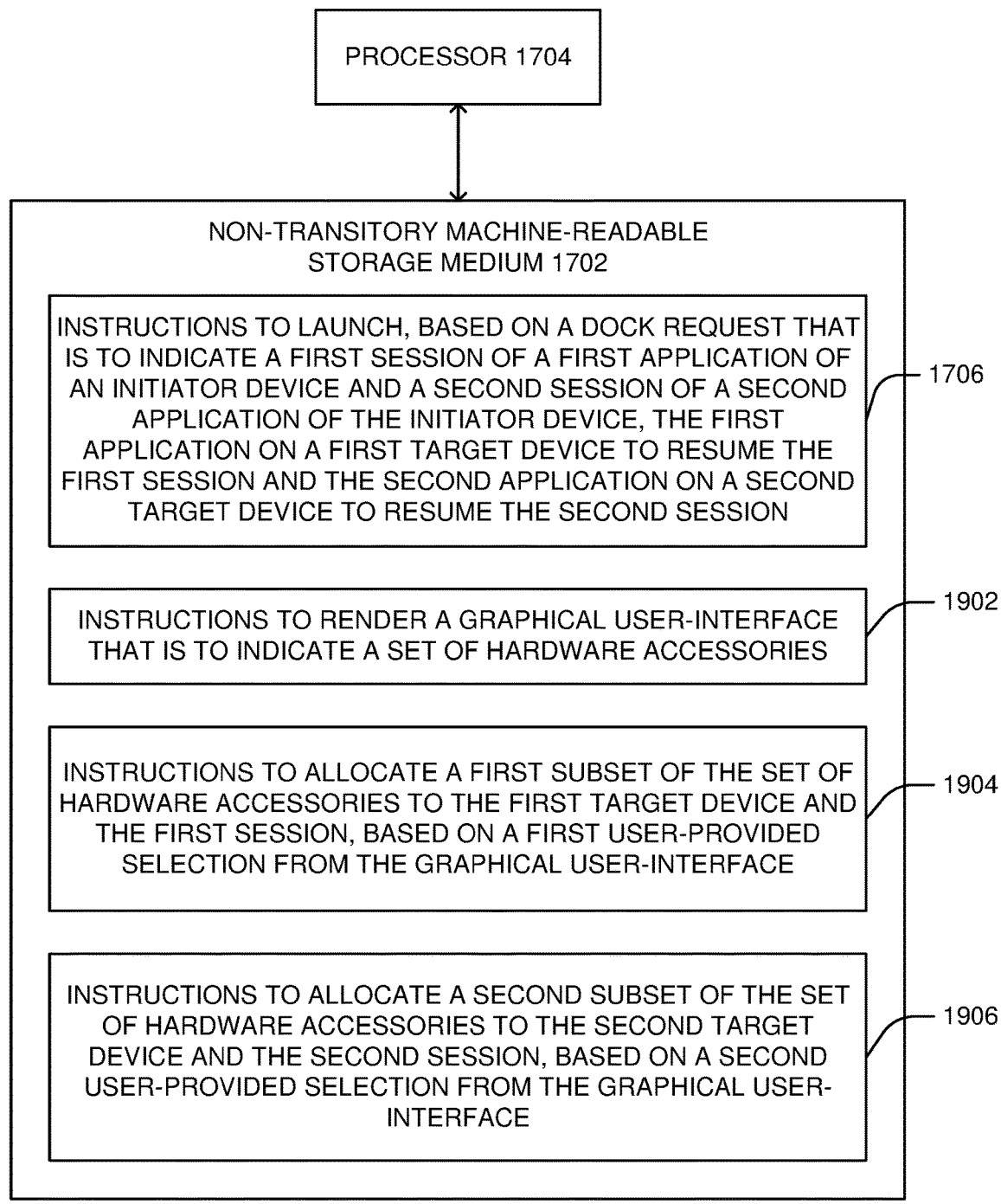

Now, consider the non-limiting block diagram 1900 of FIG. 19. In various aspects, the non-transitory machine-readable storage medium 1702 can comprise instructions 1902, 1904, and 1906. In various cases, the instructions 1902 can be instructions to render a graphical user-interface that is to indicate a set of hardware accessories. In various examples, the instructions 1904 can be instructions to allocate a first subset of the set of hardware accessories to the first target device and the first session, based on a first user-provided selection from the graphical user-interface. In various aspects, the instructions 1906 can be instructions to allocate a second subset of the set of hardware accessories to the second target device and the second session, based on a second user-provided selection from the graphical user-interface.

Figure 20:
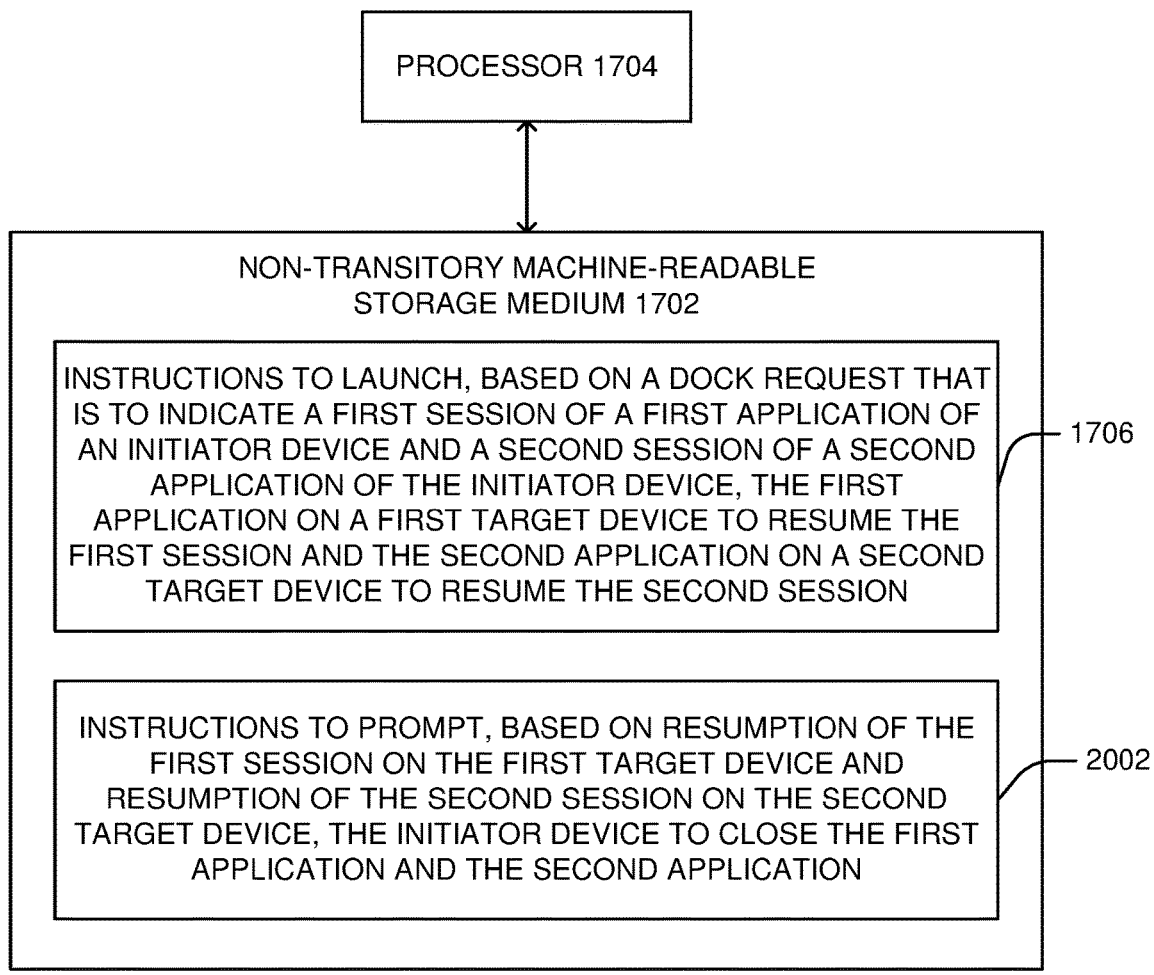

Now, consider the non-limiting block diagram 2000 of FIG. 20. In various aspects, the non-transitory machine-readable storage medium 1702 can comprise instructions 2002. In various aspects, the instructions 2002 can be instructions to prompt, based on resumption of the first session on the first target device and resumption of the second session on the second target device, the initiator device to close the first application and the second application.

Accordingly, various examples described herein can be considered as facilitating automatic application docking based on QR code scanning. As described herein, such automatic application docking can be considered as less time-consuming, as less cumbersome, or as more seamless than manual re-login procedures. Such non-limiting examples thus constitute useful and practical applications of computers.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

While various examples are described herein in the general context of non-transitory machine-readable storage media instructions that can run on computers, such examples can be implemented in combination with other program components or as a combination of hardware and non-transitory machine-readable storage media instructions. Generally, program components can include routines, programs, modules, data structures, or the like, that can perform particular tasks or that can implement particular abstract data types.

Various examples described herein can be practiced in distributed computing environments where any suitable tasks can be performed by remote processing devices linked through any suitable communications network. In a distributed computing environment, program components can be located in local or remote memory storage devices.

Various teachings described herein include mere non-limiting examples of apparatuses, computing devices, computer program products, or computer-implemented methods. It is, of course, not possible to describe every conceivable combination of components, products, devices, apparatuses, or computer-implemented methods for purposes of describing this disclosure. However, in view of the herein teachings, various further combinations or permutations of this disclosure are possible.

To the extent that the terms "includes," "has," "possesses," and the like are used in the detailed description, claims, appendices, or drawings, such terms are intended to be inclusive in a manner similar to the term "comprising" as "comprising" is interpreted when employed as a transitional word in a claim. The descriptions of the various examples have been presented for purposes of illustration, and such descriptions are not intended to be exhaustive or limited to the examples disclosed. Many modifications or variations can be implemented without departing from the scope and spirit of the described examples.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used herein and annexed drawings should generally be construed to mean "one or more" unless specified otherwise or clear from context to be directed to a singular form. As used herein, the term "example" is utilized to mean serving as an example, instance, or illustration. For the avoidance of doubt, the subject matter disclosed herein is not limited by such examples.

What is claimed is:

1. A target device, comprising:
   a processor; and
   a non-transitory machine-readable memory with machine-readable instructions stored thereon, the machine-readable instructions executable to cause the processor to:
   launch, based on a dock request that is to indicate a session of a first instance of an application of an initiator device, a second instance of the application on the target device, wherein the second instance is to resume the session, and wherein the launch is based on a determination that a dock credential of a Quick Response (QR) code generated by the target device is in the dock request.

2. The target device of claim 1, wherein the machine-readable instructions are executable to cause the processor to:
   render the QR code on an electronic display of the target device.

3. The target device of claim 2, wherein the processor is to render the QR code based on a determination that the initiator device is within a threshold proximity of the target device.

4. The target device of claim 1, wherein the machine-readable instructions are executable to cause the processor to:
render, based on a determination that the application is installed on the target device, a graphical user-interface that is to indicate that the session is dockable on the target device, wherein the processor is to launch the second instance based on a user-provided selection of the session from the graphical user-interface.

5. The target device of claim 1, wherein the machine-readable instructions are executable to cause the processor to:
render a graphical user-interface that is to indicate a hardware accessory that is controllable by the target device; and
allocate the hardware accessory to the session, based on a user-provided selection of the hardware accessory from the graphical user-interface.

6. The target device of claim 1, wherein the initiator device is a mobile device, wherein the application is a videoconference application, wherein the session is a videoconference call, and wherein the dock request comprises a call credential associated with the videoconference call.

7. A method, comprising:
transmitting, by an initiator device comprising a processor and to a target device, a dock request, wherein the dock request is to indicate a session of a first instance of an application of the initiator device, wherein the dock request is to instruct the target device to launch a second instance of the application to continue the session, and wherein the transmitting is in response to a detection of a Quick Response (QR) code generated by the target device.

8. The method of claim 7, wherein the target device is to render the QR code, and comprising:
scanning, by the initiator device, the QR code, wherein the QR code is to indicate a dock credential; and
inserting, by the initiator device, the dock credential in the dock request.

9. The method of claim 8, comprising:
prompting, by the initiator device and based on a determination that the initiator device is within a threshold distance of the target device, the target device to render the QR code.

10. The method of claim 7, comprising:
cancelling, by the initiator device, the first instance, based on the launch of the second instance.

11. A non-transitory machine-readable storage medium encoded with instructions executable by a processor, the non-transitory machine-readable storage medium comprising:
instructions to launch, based on a dock request that is to indicate a first session of a first application of an initiator device and a second session of a second application of the initiator device, the first application on a first target device to resume the first session and the second application on a second target device to resume the second session.

12. The non-transitory machine-readable storage medium of claim 11, comprising:
instructions to render a matrix code that is to indicate a dock credential, wherein the processor is to launch the first application on the first target device and the second application on the second target device based on a determination that the dock credential is in the dock request.

13. The non-transitory machine-readable storage medium of claim 12, wherein the processor is to render the matrix code based on a determination that the initiator device is within a threshold proximity of the processor.

14. The non-transitory machine-readable storage medium of claim 11, comprising:
instructions to render a graphical user-interface that is to indicate a set of hardware accessories;
instructions to allocate a first subset of the set of hardware accessories to the first target device and the first session, based on a first user-provided selection from the graphical user-interface; and
instructions to allocate a second subset of the set of hardware accessories to the second target device and the second session, based on a second user-provided selection from the graphical user-interface.

15. The non-transitory machine-readable storage medium of claim 11, comprising:
instructions to prompt, based on resumption of the first session on the first target device and resumption of the second session on the second target device, the initiator device to close the first application and the second application.

* * * * *